United States Patent
Burger et al.

(10) Patent No.: US 11,645,493 B2
(45) Date of Patent: May 9, 2023

(54) FLOW FOR QUANTIZED NEURAL NETWORKS

(71) Applicant: Microsoft Technology Licensing, LLC, Redmond, WA (US)

(72) Inventors: Douglas C. Burger, Bellevue, WA (US); Eric S. Chung, Woodinville, WA (US); Bita Darvish Rouhani, La Jolla, CA (US); Daniel Lo, Bothell, WA (US); Ritchie Zhao, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1182 days.

(21) Appl. No.: 15/972,054

(22) Filed: May 4, 2018

(65) Prior Publication Data

US 2019/0340492 A1 Nov. 7, 2019

(51) Int. Cl.
*G06N 3/04* (2006.01)
*G06F 9/30* (2018.01)
*G06F 17/16* (2006.01)
*G06F 17/18* (2006.01)
(Continued)

(52) U.S. Cl.
CPC ............ *G06N 3/04* (2013.01); *G06F 9/30025* (2013.01); *G06F 17/16* (2013.01); *G06F 17/18* (2013.01); *G06N 3/08* (2013.01)

(58) Field of Classification Search
CPC ........ G06N 3/04; G06N 3/08; G06F 9/30025; G06F 17/16; G06F 17/18
See application file for complete search history.

(56) References Cited

U.S. PATENT DOCUMENTS

| 4,177,476 A | 12/1979 | Kroger et al. |
| 4,242,534 A | 12/1980 | Marsing |
| 4,366,494 A | 12/1982 | Ohta |

(Continued)

FOREIGN PATENT DOCUMENTS

CN 107704922 A 2/2018

OTHER PUBLICATIONS

Drumond, Mario, et al. "End-to-end dnn training with block floating point arithmetic." arXiv preprint arXiv:1804.01526 (2018). (Year: 2018).*

(Continued)

*Primary Examiner* — Benjamin P Geib
(74) *Attorney, Agent, or Firm* — Workman Nydegger

(57) ABSTRACT

Methods and apparatus are disclosed supporting a design flow for developing quantized neural networks. In one example of the disclosed technology, a method includes quantizing a normal-precision floating-point neural network model into a quantized format. For example, the quantized format can be a block floating-point format, where two or more elements of tensors in the neural network share a common exponent. A set of test input is applied to a normal-precision flooding point model and the corresponding quantized model and the respective output tensors are compared. Based on this comparison, hyperparameters or other attributes of the neural networks can be adjusted. Further, quantization parameters determining the widths of data and selection of shared exponents for the block floating-point format can be selected. An adjusted, quantized neural network is retrained and programmed into a hardware accelerator.

17 Claims, 16 Drawing Sheets

(51) Int. Cl.
   G06F 3/08      (2006.01)
   G06N 3/08      (2023.01)

(56) References Cited

U.S. PATENT DOCUMENTS

| | | | |
|---|---|---|---|
| 4,660,061 | A | 4/1987 | Sweeny et al. |
| 5,110,034 | A | 5/1992 | Simmonds |
| 5,326,988 | A | 7/1994 | Ishida |
| 5,386,870 | A | 2/1995 | Nieman et al. |
| 5,571,602 | A | 11/1996 | Eckels et al. |
| 5,773,875 | A | 6/1998 | Chan |
| 5,793,056 | A | 8/1998 | Forrester et al. |
| 5,821,556 | A | 10/1998 | Chew et al. |
| 6,051,846 | A | 4/2000 | Burns et al. |
| 6,088,604 | A | 7/2000 | Williams et al. |
| 6,144,977 | A | 11/2000 | Giangarra et al. |
| 6,304,538 | B1 | 10/2001 | Hayashi |
| 6,352,741 | B1 | 3/2002 | Chan et al. |
| 6,353,234 | B1 | 3/2002 | Faley et al. |
| 6,438,967 | B1 | 8/2002 | Sarwinski et al. |
| 6,642,608 | B1 | 11/2003 | Hu |
| 9,880,365 | B2 | 1/2018 | Goutzoulis et al. |
| 2005/0062131 | A1 | 3/2005 | Murduck et al. |
| 2005/0092981 | A1 | 5/2005 | Hunt |
| 2006/0072254 | A1 | 4/2006 | Sargent et al. |
| 2006/0240991 | A1 | 10/2006 | Takahashi et al. |
| 2008/0278166 | A1 | 11/2008 | Wosik et al. |
| 2010/0087322 | A1 | 4/2010 | Yuan et al. |
| 2010/0184604 | A1 | 7/2010 | Roden et al. |
| 2010/0210468 | A1 | 8/2010 | Lee et al. |
| 2013/0082804 | A1 | 4/2013 | Kawaguchi |
| 2013/0258595 | A1 | 10/2013 | Tuckerman |
| 2014/0100119 | A1 | 4/2014 | Schlenga et al. |
| 2014/0110848 | A1 | 4/2014 | Taylor et al. |
| 2014/0289445 | A1 | 9/2014 | Savich |
| 2016/0125311 | A1 | 5/2016 | Fuechsle et al. |
| 2016/0328646 | A1 | 11/2016 | Lin et al. |
| 2017/0123171 | A1 | 5/2017 | Goutzoulis et al. |
| 2017/0124454 | A1 | 5/2017 | Vasudevan et al. |
| 2018/0089562 | A1 | 3/2018 | Jin et al. |
| 2018/0157940 | A1 | 6/2018 | Yang et al. |
| 2018/0322607 | A1 | 11/2018 | Mellempudi et al. |
| 2019/0171420 | A1 | 6/2019 | Malaya et al. |
| 2019/0286973 | A1 | 9/2019 | Kovvuri et al. |
| 2019/0340499 | A1 | 11/2019 | Burger et al. |
| 2020/0380357 | A1 | 12/2020 | Yao et al. |

OTHER PUBLICATIONS

Zhou, Yiren, et al. "Adaptive Quantization for Deep Neural Network." arXiv preprint arXiv:1712.01048 (2017). (Year: 2017).*

Shin, Sungho, Yoonho Boo, and Wonyong Sung. "Fixed-point optimization of deep neural networks with adaptive step size retraining." 2017 IEEE International conference on acoustics, speech and signal processing (ICASSP). IEEE, 2017. (Year: 2017).*

Anwar, Sajid, Kyuyeon Hwang, and Wonyong Sung. "Fixed point optimization of deep convolutional neural networks for object recognition." 2015 IEEE International Conference on Acoustics, Speech and Signal Processing (ICASSP). IEEE, 2015. (Year: 2017).*

Song, Zhourui, Zhenyu Liu, and Dongsheng Wang. "Computation Error Analysis of Block Floating Point Arithmetic Oriented Convolution Neural Network Accelerator Design." arXiv preprint arXiv:1709.07776 (2017). (Year: 2017).*

"Ex Parte Quayle Action Issued in U.S. Appl. No. 15/836,667", dated Apr. 19, 2018, 10 Pages.

Assali, et al., "Hyperfine Interactions in Silicon Quantum Dots", In Journal of Physical Review B, vol. 83, No. 16, Apr. 4, 2011, pp. 1-6.

Bonderson, et al., "Topological Quantum Buses: Coherent Quantum Information Transfer between Topological and Conventional Qubits", In Journal of Physical review Letters, vol. 106, No. 13, Mar. 28, 2011, pp. 1-5.

Brummer, et al., "Phase and Amplitude Modulator for Microwave Pulse Generation", In Journal of IEEE Transactions on Applied Superconductivity, vol. 21, Issue 3, Jun. 2011, 4 Pages.

Camin, et al., "Cryogenic Behavior of Optoelectronic Devices for the Transmission of Analog Signals via Fiber Optics", In Journal of IEEE Transactions on Nuclear Science, vol. 53, Issue 6, Dec. 2006, 5 Pages.

Cavallaro, et al., "A 3-5-GHz UWB Front-End for Low-Data Rate WPANs in 90-nm CMOS", In Journal of IEEE Transactions on Microwave Theory and Techniques, vol. 58, Issue 4, Apr. 2010, 12 Pages.

Cavallaro, et al., "An Ultra-wideband Transmitter based on a New Pulse Generator", In Proceedings of IEEE Radio Frequency Integrated Circuits Symposium, Jun. 17, 2008, 4 Pages.

Chang, et al., "High-efficiency, High-speed VCSELs with 35 Gbit/s Error-free Operation", In Journal of Electronics Letters, vol. 43, Issue 19, Sep. 13, 2007, 2 Pages.

Gambetta, et al., "Analytic Control Methods for High Fidelity Unitary Operations in a Weakly Nonlinear Oscillator", In Journal of Physical review A, vol. 83, No. 1, Jan. 18, 2011, 15 Pages.

Goncher, et al., "Cryogenic Operation of AlGaAs—GaAs Vertical-cavity Surface-Emitting Lasers at Temperatures from 200 K to 6 K", In Journal of IEEE Photonics Technology Letters, vol. 8, Issue 3, Mar. 1996, 3 Pages.

Groszkowskl, et al., "Tunable Coupling between Three Qubits as a Building Block for a Superconducting Quantum Computer", In Journal of Physical Review B, vol. 84, No. 14, Oct. 17, 2011, pp. 1-8.

Gupta, et al., "Preserving Niobium Superconductivity in Thin-Film Superconducting Flexible Cables", In Additional Conferences {Device Packaging, HiTEC, HiTEN, & CICMT), Jan. 2006, 3 Pages.

Krishnamoorthy, Ashok V., "Overview of Short-reach Optical Interconnects: From VCSELs to Silicon Nanophotonics", In Proceedings of IEEE Hot Chips Symposium, Aug. 22, 2010, 31 Pages.

Lebrun, Philippe, "Superconductivity and Ancillary Cryogenics at CERN: From Bubble Chambers to Accelerators", In Proceedings of the CERN Centennial Superconductivity Symposium, Dec. 8, 2011, 43 Pages.

Maune, et al., "Coherent Singlet-triplet Oscillations in a Silicon-based Double Quantum Dot", In Journal of Nature, vol. 481, Issue 7831, Jan. 18, 2012, 4 Pages.

Motzoi, et al., "Optimal control methods for fast time-varying Hamiltonians", In Journal of Physical review A, vol. 84, No. 2, Aug. 4, 2011, pp. 1-10.

Motzoi, et al., "Simple Pulses for Elimination of Leakage in Weakly Nonlinear Qubits", In Journal of Physical review Letters, vol. 103, No. 11, Sep. 8, 2009, pp. 1-4.

Mutig, et al., "Progress on High-Speed 980nm VCSELs for Short-Reach Optical Interconnects", In Journal of Advances in Optical Technologies, vol. 2011, Jul. 2011, 17 Pages.

Prance, et al., "Single-shot measurement of triplet-singlet relaxation in a Si/SiGe double quantum dot", In Journal of Physical review Letters, vol. 108, No. 4, Jan. 26, 2012, pp. 1-6.

Qin, et al., "A Programmable 1.8pJ/pulse Gaussian Pulse Generator for Impulse UWB Transceiver in 90nm CMOS", In Proceedings of IEEE Radio and Wireless Symposium, Jan. 18, 2009, 4 Pages.

Shi, et al., "A Fast "hybrid" Silicon Double Quantum Dot Qubit", In Journal of Physical review Letters, vol. 108, No. 14, Apr. 4, 2012, pp. 1-12.

Taubenblatt, Marc A., "Optical Interconnects for High Performance Computing", In Journal of Lightwave Technology, vol. 30, Issue 4, Feb. 15, 2012, 11 Pages.

Tinkham, Michael, "Introduction to Superconductivity", In Publication of McGraw-Hill, 1996, 472 Pages.

Tuckerman, et al., "Flexible Superconducting Nb Transmission Lines on Thin Film Polyimide for Quantum Computing Applications", In Journal of Superconductor Science and Technology, vol. 29, No. 8, Jul. 11, 2016, 13 Pages.

Weers, et al., "Niobium Flex Cable for Low Temperature High Density Interconnects", In Journal of Cryogenics, vols. 55-56, May 2013, 4 Pages.

Wentzloff, et al., "Gaussian Pulse Generators for Subbanded Ultra-Wideband Transmitters", In Journal of IEEE Transactions on Microwave Theory and Techniques, vol. 54, No. 4, Apr. 2006, pp. 1647-1655.

(56) References Cited

OTHER PUBLICATIONS

Das, et al., "Mixed Precision Training of Convolutional Neural Networks using Integer Operations", Published as a Conference Paper at International Conference on Learning Representations, Feb. 3, 2018, 11 Pages.

Drumond, et al., "End-to-End DNN Training with Block Floating Point Arithmetic", In Journal of a Computing Research Repository, Apr. 4, 2018, 9 Pages.

"International Search Report and Written Opinion Issued in PCT Application No. PCT/US2019/029254", dated Sep. 3, 2019, 11 Pages.

"Final Office Action Issued in U.S. Appl. No. 15/971,850", dated Oct. 29, 2021, 26 Pages.

Jacob, et al., "Quantization and Training of Neural Networks for Efficient Integer-Arithmetic-Only Inference", https://arxiv.org/abs/1712.05877, Dec. 15, 2017, pp. 2704-2713.

"Non Final Office Action Issued in U.S. Appl. No. 15/971,850", dated Apr. 21, 2021, 31 Pages.

Zhuang, et al., "Towards Effective Low-bitwidth Convolutional Neural Networks", In Repository of arXiv:1711.00205v2, Nov. 17, 2017, 11 Pages.

Lane, et al., "DeepX: A Software Accelerator for Low-Power Deep Learning Inference on Mobile Devices", In Proceedings of 15th ACM/IEEE International Conference on Information Processing in Sensor Networks, Apr. 11, 2016, 12 Pages.

Pradelle, et al., "Polyhedral Optimization of TensorFlow Computation Graphs", In Book of Programming and Performance Visualization Tools, Published by Springer, Nov. 12, 2017, pp. 74-89.

Abadi, et al., "TensorFlow: Large-Scale Machine Learning on Heterogeneous Distributed Systems", Published in Preliminary White Paper, Nov. 9, 2015, 19 Pages.

Gysel, Philipp, "Ristretto: Hardware-Oriented Approximation of Convolutional Neural Networks", In repository of arXiv preprint, arXiv:1605.06402, May 20, 2016, 65 Pages.

"International Search Report and Written Opinion Issued in PCT Application No. PCT/US19/020860", dated Aug. 12, 2019, 21 Pages.

"International Search Report and Written Opinion Issued in PCT Application No. PCT/US19/029255", dated Aug. 14, 2019, 11 Pages.

Sung, et al., "Resiliency of Deep Neural Networks Under Quantization" Under Review as a Conference Paper at International Conference on Learning Representations, Jan. 7, 2016, 11 Pages.

"Non Final Office Action Issued in U.S. Appl. No. 15/972,048", dated Nov. 30, 2021, 59 Pages.

Chung, et al., "Hardware Node Having a Matrix Vector Unit With Block-Floating Point Processing" Application as filed in U.S. Appl. No. 15/680,649, filed Aug. 18, 2017, 45 Pages.

Courbariaux et al., "Training Deep Neural Networks with Low Precision Multiplications," Sep. 23, 2015, 10 pages.

Elam et al., "A Block Floating Point Implementation for an N-Point FFT on the TMS320C55x DSP," Texas Instruments Application Report SPRA948, Sep. 2003, 13 pages.

"FFT/IFFT Block Floating Point Scaling," Altera Corporation Application Note 404, Oct. 2005, ver. 1.0, 7 pages.

Goodfellow et al., "Deep Learning," downloaded from http://www.deeplearningbook.org/ on May 2, 2018, (document dated 2016), 766 pages.

Gupta et al., "Deep Learning with Limited Numerical Precision," Feb. 9, 2015, 10 pages.

Gysel et al., "Hardware-Oriented Approximation of Convolutional Neural Networks," Oct. 20, 2016, 8 pages.

Köster et al., "Flexpoint: An Adaptive Numerical Format for Efficient Training of Deep Neural Networks," Intel Corporation, Dec. 2017, 14 pages.

Langhammer et al., "Floating-Point DSP Block Architecture for FPGAs," *Proceedings of the 2015 ACM/SIGDA International Symposium on Field-Programmable Gate Arrays*, Feb. 2015, pp. 117-125.

Mellempudi et al., "Ternary Neural Networks with Fine-Grained Quantization," May 2017, 11 pages.

Muller et al., "Handbook of Floating-Point Arithmetic," Birkhauser Boston (New York 2010), 78 pages including pp. 269-320.

Nielsen, "Neural Networks and Deep Learning," downloaded from http://neuralnetworksanddeeplearning.com/index.html on May 2, 2018, document dated Dec. 2017, 314 pages.

Rajpurkar et al., "SQuAD: 100,000+ Questions for Machine Comprehension of Text," Oct. 2016, 10 pages.

Rastegari et al., "XNOR-Net: ImageNet Classification Using Binary Convolutional Neural Networks," Aug. 2016, 17 pages.

Vucha et al., "Design and FPGA Implementation of Systolic Array Architecture for Matrix Multiplication," *International Journal of Computer Applications*, vol. 26, No. 3, Jul. 2011, 5 pages.

Wilkinson, "Rounding Errors in Algebraic Processes," *Notes on Applied Science No. 32*, Department of Scientific and Industrial Research, National Physical Laboratory (United Kingdom) (London 1963), 50 pages including pp. 26-33, 79-91, and 122-139.

"Final Office Action Issued in U.S. Appl. No. 15/972,048", dated Mar. 30, 2022, 30 Pages.

"Non Final Office Action Issued in U.S. Appl. No. 15/971,850", dated Apr. 12, 2022, 28 Pages.

Cyphers, et al., "Intel nGraph: An Intermediate Representation, Compiler, and Executor for Deep Learning", In Repository of arxiv:1801.08058v2, Jan. 30, 2018, 3 Pages.

Venieris, et al., "fpgaConvNet: A Toolflow for Mapping Diverse Convolutional Neural Networks on Embedded FPGAs", In Repository of arxiv:1711.08740v1, Nov. 23, 2017, 5 Pages.

"Non Final Office Action issued in U.S. Appl. No. 15/972,048", dated Aug. 31, 2022, 26 Pages.

Zhou, et al., "Incremental Network Quantization: Towards Lossless CNNs with Low-Precision Weights", In Repository of arXiv:1702.03044v2, Aug. 25, 2017, pp. 1-14.

U.S. Appl. No. 62/643,097, filed Mar. 14, 2018.

"Final Office Action Issued in U.S. Appl. No. 15/971,850", dated Sep. 26, 2022, 26 Pages.

U.S. Appl. No. 15/971,850, filed May 4, 2018.

U.S. Appl. No. 15/972,048, filed May 4, 2018.

U.S. Appl. No. 15/971,817, filed May 4, 2018.

"Non Final Office Action Issued in U.S. Appl. No. 15/971,850", dated Dec. 16, 2022, 28 Pages.

"Final Office Action Issued in U.S. Appl. No. 15/972,048", dated Nov. 15, 2022, 29 Pages.

Ji, et al., "Bridging the Gap Between Neural Networks and Neuromorphic Hardware with a Neural Network Compiler", In Repository of arXiv:1801.00746v3, Jan. 18, 2018, pp. 1-13.

"Office Action Issued in European Patent Application No. 19730599.8", dated Jan. 17, 2023, 6 Pages.

Drumond, et al., "Training DNNs with Hybrid Block Floating Point", In repository of arxiv code: 1804.01526v1 [cs.LG], Apr. 4, 2018, 9 Pages.

* cited by examiner

FIG. 4
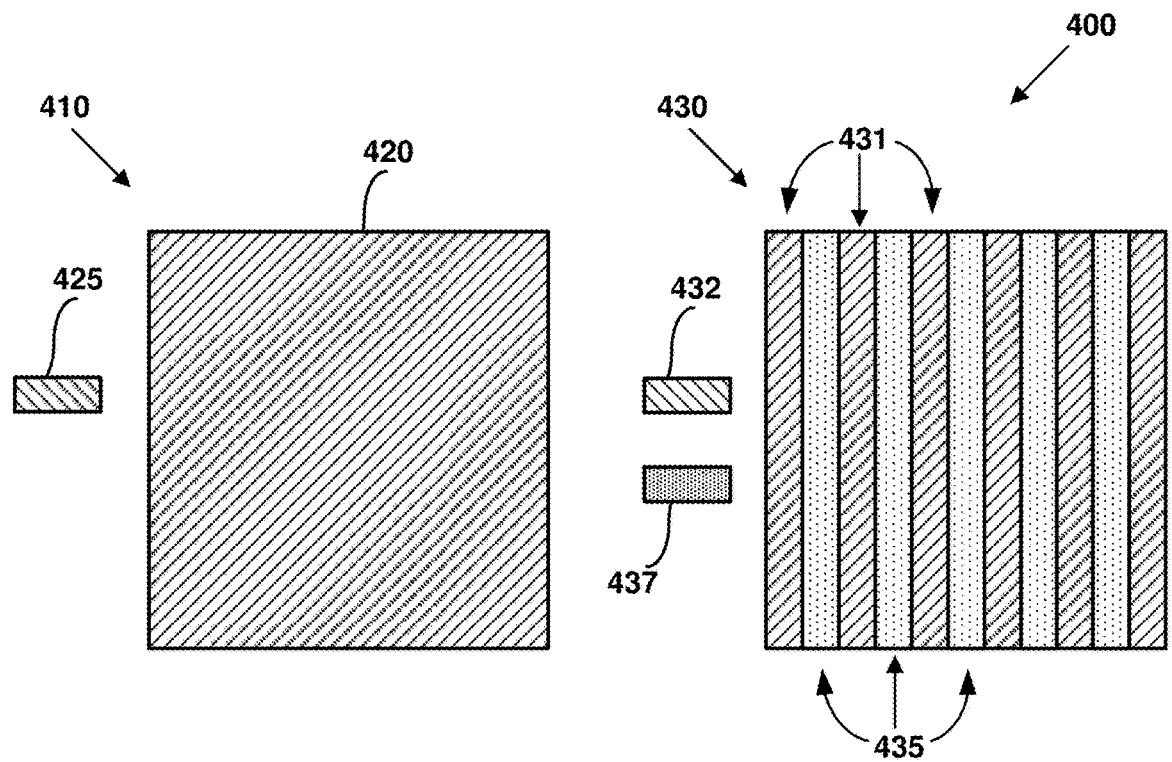
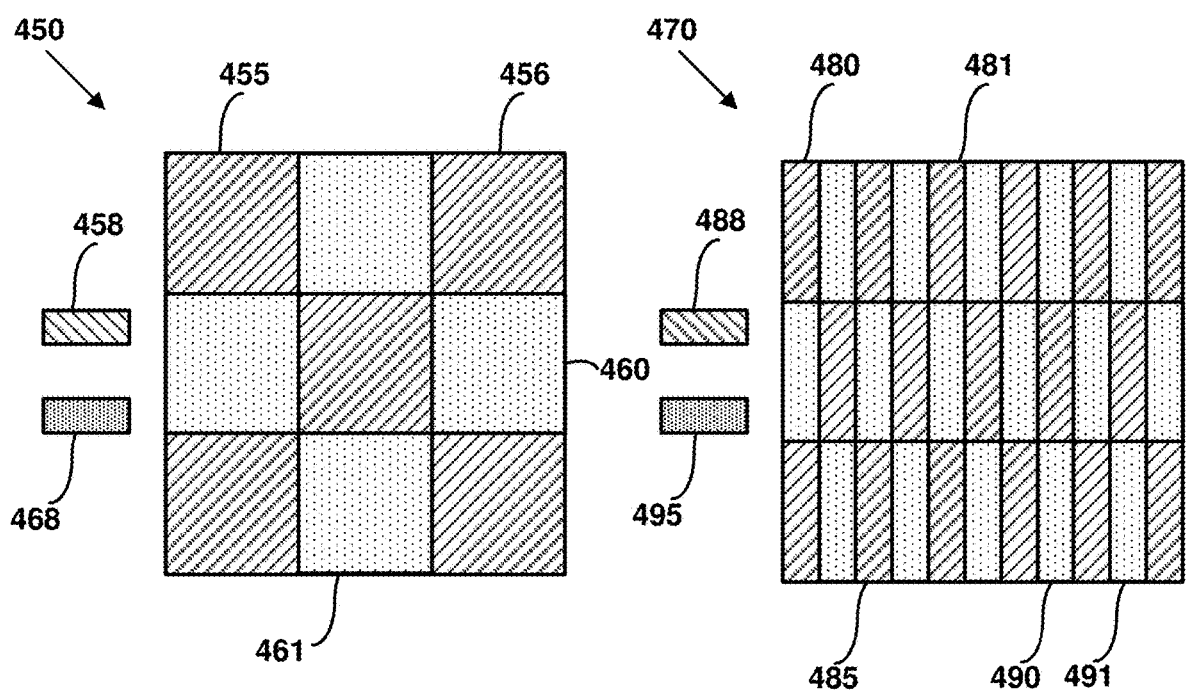

FLOW FOR QUANTIZED NEURAL NETWORKS

BACKGROUND

Machine learning (ML) and artificial intelligence (AI) techniques can be useful for solving a number of complex computational problems such as recognizing images and speech, analyzing and classifying information, and performing various classification tasks. Machine learning is a field of computer science that uses statistical techniques to give computer systems the ability to extract higher-level features from a set of training data. Specifically, the features can be extracted by training a model such as an artificial neural network (NN) or a deep neural network (DNN). After the model is trained, new data can be applied to the model and the new data can be classified (e.g., higher-level features can be extracted) using the trained model. Machine learning models are typically executed on a general-purpose processor (also referred to as a central processing unit (CPU)). However, the models can be computationally expensive and so it may not be possible to perform feature extraction in real-time using general-purpose processors. Accordingly, there is ample opportunity for improvements in computer hardware and software to implement neural networks.

SUMMARY

Methods and apparatus are disclosed for providing for designing and implementing quantized Precision neural network models. In some examples of the disclosed technology, a quantization enabled system is used to perform a method including quantizing a normal-precision neural network model having a plurality of tensors of normal-precision floating-pointe numbers. The quantized neural network model is evaluated by applying input tensors to input layers of the quantized neural network model, thereby producing quantized output. The quantized output can be compared to output generated by applying these input tensors two the normal-precision floating-pointe model. Based on the comparing, the source normal-precision floating-point model and/or the quantized neural network model can be retrained by adjusting hyperparameters selected to improve accuracy of the quantized neural network model. Further, quantization parameters for the quantized neural network model, such as data widths or common exponent selection, can be adjusted based on the comparing. The adjusted quantized model can be retrained and the resulting retrained model values can be used to program a hardware accelerator. Thus, a convenient design flow is provided to allow implementation of high performance neural network models on hardware accelerators having improved accuracy, improve performance, and improved consumption of computational resources available for providing the model.

In some examples of the disclosed technology, a quantization-enabled system includes general purpose processors that perform operations on neural networks stored in memory. By providing a number of operations for a design flow, the system can be used to select hyperparameters and quantization parameters for programming a hardware accelerator coupled to the quantization enabled system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, any trademarks used herein remain the property of their respective owners. The foregoing and other objects, features, and advantages of the disclosed embodiments will become more apparent from the following detailed description, which proceeds with reference to the accompanying figures.

BRIEF DESCRIPTION OF THE DRAWINGS

FIG. 4 depicts a number of alternative block floating-point formats that can be used to represent quantized neural network models, as can be used in certain examples of the disclosed technology.

DETAILED DESCRIPTION

I. General Considerations

Figure 1:
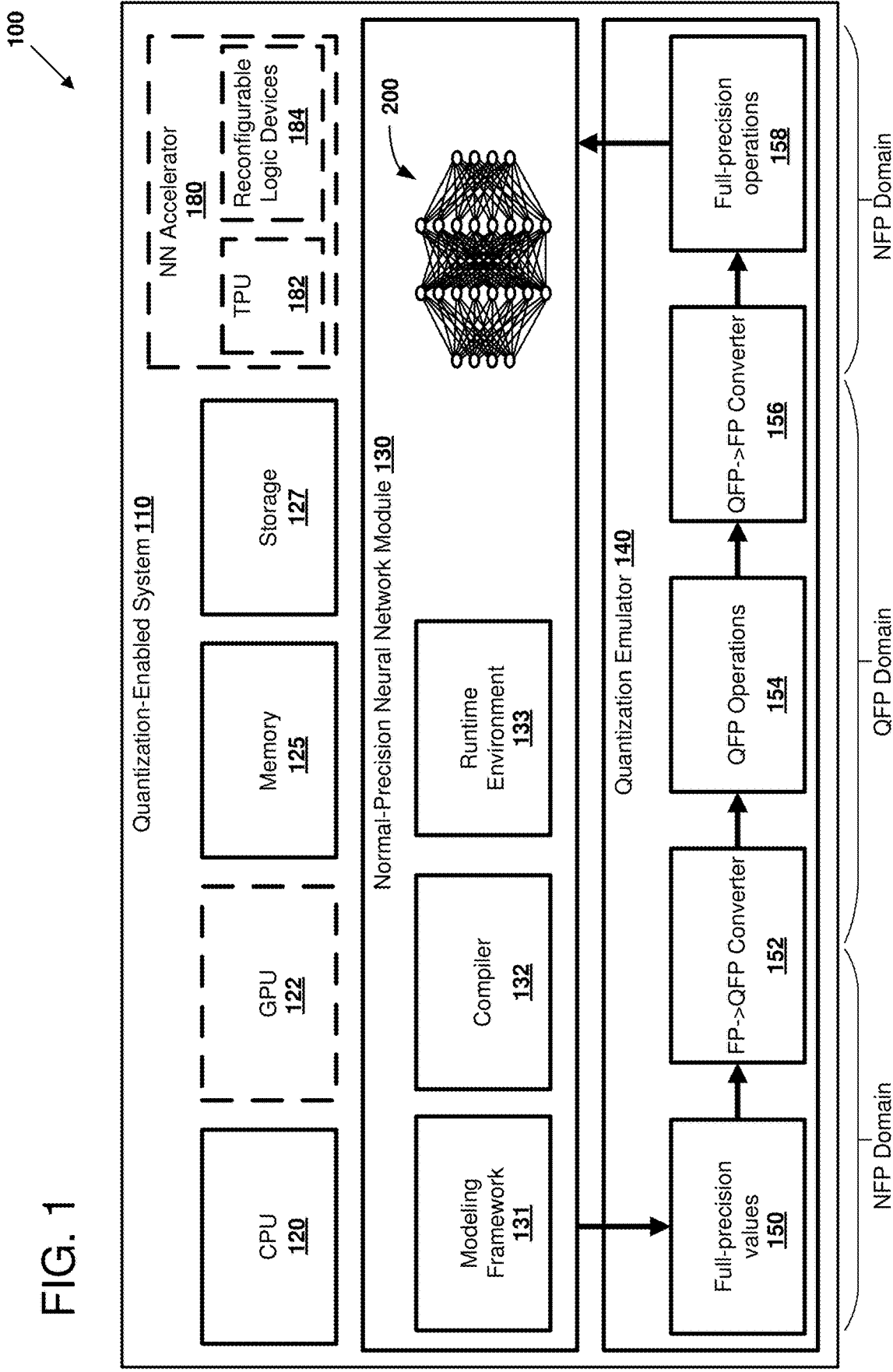
FIG. 1 is a block diagram of a quantization-enabled system, as can be implemented in certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "perform," "select," "receive," "emit," "verify," and "convert" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application, or a software application that is accessed or downloaded via a web browser or other software application (such as a remote computing application). Such software can be executed, for example, on a single local computer (e.g., with general-purpose and/or specialized processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Neural Networks and Quantized Formats

Artificial Neural Networks (ANNs or as used throughout herein, "NNs") are applied to a number of applications in Artificial Intelligence and Machine Learning including image recognition, speech recognition, search engines, and other suitable applications. The processing for these applications may take place on individual devices such as personal computers or cell phones, but it may also be performed in large datacenters. At the same time, hardware accelerators that can be used with NNs include specialized NN processing units, such as tensor processing units (TPUs) and Field Programmable Gate Arrays (FPGAs) programmed to accelerate neural network processing. Such hardware devices are being deployed in consumer devices as well as in data centers due to their flexible nature and low power consumption per unit computation.

Traditionally NNs have been trained and deployed using single-precision floating-point (32-bit floating-point or float32 format). However, it has been shown that lower precision floating-point formats, such as 16-bit floating-point (float16) or fixed-point can be used to perform inference operations with minimal loss in accuracy. On specialized hardware, such as FPGAs, reduced precision formats can greatly improve the latency and throughput of DNN processing.

Numbers represented in normal-precision floating-point format (e.g., a floating-point number expresses in a 16-bit floating-point format, a 32-bit floating-point format, a 64-bit floating-point format, or an 80-bit floating-point format) can be converted to quantized-precision format numbers may allow for performance benefits in performing operations. In particular, NN weights and activation values can be represented in a lower-precision quantized format with an acceptable level of error introduced. Examples of lower-precision quantized formats include formats having a reduced bit width (including by reducing the number of bits used to represent a number's mantissa or exponent) and block floating-point formats where two or more numbers share the same single exponent.

One of the characteristics of computation on an FPGA device is that it typically lacks hardware floating-point support. Floating-point operations may be performed at a penalty using the flexible logic, but often the amount of logic needed to support floating-point is prohibitive in FPGA implementations. Some newer FPGAs have been developed that do support floating-point computation, but even on these the same device can produce twice as many computational outputs per unit time as when it is used in an integer mode. Typically, NNs are created with floating-point computation in mind, but when an FPGA is targeted for NN processing it would be beneficial if the neural network could be expressed using integer arithmetic. Examples of the disclosed technology include hardware implementations of block Floating-point (BFP), including the use of BFP in NN, FPGA, and other hardware environments.

A typical floating-point representation in a computer system consists of three parts: sign (s), exponent (e), and mantissa (m). The sign indicates if the number is positive or negative. The exponent and mantissa are used as in scientific notation:

$$\text{Value} = s \times m \times 2^e$$

Any number may be represented, within the precision limits of the mantissa. Since the exponent scales the mantissa by powers of 2, just as the exponent does by powers of 10 in scientific notation, the magnitudes of very large numbers may be represented. The precision of the representation is determined by the precision of the mantissa. Typical floating-point representations use a mantissa of 10 (float 16), 24 (float 32), or 53 (float64) bits in width. An integer with magnitude greater than $2^{53}$ can be approximated in a float64 floating-point format, but it will not be represented exactly because there are not enough bits in the mantissa. A similar effect can occur for arbitrary fractions where the fraction is represented by bits of the mantissa that take on the value of negative powers of 2. There are many fractions that cannot be exactly represented because they are irrational in a binary number system. More exact representations are possible in both situations, but they may require the mantissa to contain more bits. Ultimately, an infinite number of mantissa bits are required to represent some numbers exactly $$\left(\text{e.g., } \frac{1}{3} = 0.\overline{3}; \frac{22}{7} = 3.\overline{142857}\right).$$

The 10-bit (half precision float), 24-bit (single precision float), and 53-bit (double precision float) mantissa limits are common compromises of mantissa storage requirements versus representation precision in general-purpose computers.

With block floating-point formats, a group of two or more numbers use a single shared exponent with each number still having its own sign and mantissa. In some examples, the shared exponent is chosen to be the largest exponent of the original floating-point values. For purposes of the present disclosure, the term block floating-point (BFP) means a number system in which a single exponent is shared across two or more values, each of which is represented by a sign and mantissa pair (whether there is an explicit sign bit, or the mantissa itself is signed). In some examples, all values of one or more rows or columns of a matrix or vector, or all values of a matrix or vector, can share a common exponent.

In other examples, the BFP representation may be unsigned. In some examples, some but not all of the elements in a matrix or vector BFP representation may include numbers represented as integers, floating-point numbers, fixed point numbers, symbols, or other data formats mixed with numbers represented with a sign, mantissa, and exponent. In some examples, some or all of the elements in a matrix or vector BFP representation can include complex elements having two or more parts, for example: complex numbers with an imaginary component (a+bi, where $i=\sqrt{-1}$); fractions including a numerator and denominator, in polar coordinates (r, θ), or other multi-component element.

BFP formats can be used to tradeoff precision and storage requirements, in a fashion that is similar in some respects to normal floating-point. First, rather than storing an exponent with every floating-point number, a group of numbers can share the same exponent. To share exponents while maintaining a high level of accuracy, the numbers should have close to the same magnitude, since differences in magnitude are expressed in the mantissa. If the differences in magnitude are too great, the mantissa will overflow for the large values, or may be zero ("underflow") for the smaller values. Depending on a particular application, some amount of overflow and/or underflow may be acceptable.

The size of the mantissa can be adjusted to fit a particular application. This can affect the precision of the number being represented, but potential gains are realized from a reduced representation size. For example, a normal single-precision float has a size of four bytes, but for certain implementations of the disclosed technology, only two bytes are used to represent the sign and mantissa of each value.

In certain examples of the disclosed technology, the representation expressed above is used to derive the original number from the representation, but only a single exponent is stored for a group of numbers, each of which is represented by a signed mantissa. Each signed mantissa can be represented by two bytes or less, so in comparison to four-byte floating-point, the memory storage savings is about 2×. Further, the memory bandwidth requirements of loading and storing these values are also approximately one-half that of normal floating-point.

Neural network operations are used in many artificial intelligence operations. Often, the bulk of the processing operations performed in implementing a neural network is in performing Matrix×Matrix or Matrix×Vector multiplications. Such operations are compute- and memory-bandwidth intensive, where the size of a matrix may be, for example, 1000×1000 elements (e.g., 1000×1000 numbers, each including a sign, mantissa, and exponent) or larger and there are many matrices used. As discussed herein, BFP techniques can be applied to such operations to reduce the demands for computation as well as memory bandwidth in a given system, whether it is an FPGA, CPU or another hardware platform. As used herein, the use of the term "element" herein refers to a member of such a matrix or vector.

As used herein, the term "tensor" refers to a multi-dimensional array that can be used to represent properties of a NN and includes one-dimensional vectors as well as two-, three-, four-, or larger dimension matrices. As used in this disclosure, tensors do not require any other mathematical properties unless specifically stated.

As used herein, the term "normal-precision floating-point" refers to a floating-point number format having a mantissa, exponent, and optionally a sign and which is natively supported by a native or virtual CPU. Examples of normal-precision floating-point formats include, but are not limited to, IEEE 754 standard formats such as 16-bit, 32-bit, 64-bit, or to other processors supported by a processor, such as Intel AVX, AVX2, IA32, and x86_64 80-bit floating-point formats.

As used herein, the term "quantized-precision floating-point" refers to a floating-point number format where two or more values of a tensor have been modified to emulate neural network hardware. In particular, many examples of quantized-precision floating-point representations include block floating-point formats, where two or more values of the tensor are represented with reference to a common exponent. The quantized-precision floating-point number can be generated by selecting a common exponent for two, more, or all elements of a tensor and shifting mantissas of individual elements to match the shared, common exponent. In some examples, groups of elements within a tensor can share a common exponent on, for example, a per-row, per-column, per-tile, or other basis.

III. Introduction to the Disclosed Technology

FIG. 1 is a block diagram 100 outlining an example quantization-enabled system 110 as can be implemented certain examples of the disclosed technology. As shown in FIG. 1, the quantization-enabled system 110 can include a number of hardware resources including general-purpose processors 120 and special-purpose processors such as graphics processing units 122. The processors are coupled to memory 125 and storage 127, which can include volatile or non-volatile memory devices. The processors 120 and 122 execute instructions stored in the memory or storage in order to provide a normal-precision neural network module 130. The normal-precision neural network module 130 includes software interfaces that allow the system to be programmed to implement various types of neural networks. For example, software functions can be provided that allow applications to define neural networks including weights, activation values, and interconnections between layers of a neural network. Define state elements for recurrent neural networks. The normal-precision neural network module 130 can further provide utilities to allow for training and retraining of a neural network implemented with the module. Values representing the neural network module are stored in memory or storage and are operated on by instructions executed by one of the processors.

In some examples, proprietary or open source libraries or frameworks are provided to a programmer to implement neural network creation, training, and evaluation. Examples of such libraries include TensorFlow, Microsoft Cognitive Toolkit (CNTK), Caffe, Theano, and Keras. In some examples, programming tools such as integrated development environments provide support for programmers and users to define, compile, and evaluate NNs.

The quantization-enabled system 110 further includes a quantization emulator 140. The quantization emulator 140 provides functionality that can be used to convert data represented in full precision floating-point formats in the normal-precision neural network module 130 into quantized format values. Such functionality will be discussed in further detail below.

The normal-precision neural network module 130 can be used to specify, train, and evaluate a neural network model using a tool flow that includes a hardware-agnostic modelling framework 131 (also referred to as a native framework or a machine learning execution engine), a neural network compiler 132, and a neural network runtime environment 133. The memory includes computer-executable instructions for the tool flow including the modelling framework 131, the neural network compiler 132, and the neural network runtime environment 133. The tool flow can be used to generate neural network data 200 representing all or a portion of the neural network model, such as the neural network model discussed below regarding FIG. 2. It should be noted that while the tool flow is described as having three separate tools (131, 132, and 133). The tool flow can have fewer or more tools in various examples. For example, the functions of the different tools (131, 132, and 133) can be combined into a single modelling and execution environment.

The neural network data 200 can be stored in the memory 125. The neural network data 200 can be represented in one or more formats. For example, the neural network data 200 corresponding to a given neural network model can have a different format associated with each respective tool of the tool flow. Generally, the neural network data 200 can include a description of nodes, edges, groupings, weights, biases, activation functions, and/or tensor values. As a specific example, the neural network data 200 can include source code, executable code, metadata, configuration data, data structures and/or files for representing the neural network model.

The modelling framework 131 can be used to define and use a neural network model. As one example, the modelling framework 131 can include pre-defined APIs and/or programming primitives that can be used to specify one or more aspects of the neural network model. The pre-defined APIs can include both lower-level APIs (e.g., activation functions, cost or error functions, nodes, edges, and tensors) and higher-level APIs (e.g., layers, convolutional neural networks, recurrent neural networks, linear classifiers, and so forth). "Source code" can be used as an input to the modelling framework 131 to define a topology of the graph of a given neural network model. In particular, APIs of the modelling framework 131 can be instantiated and interconnected within the source code to specify a complex neural network model. A data scientist can create different neural network models by using different APIs, different numbers of APIs, and interconnecting the APIs in different ways.

In addition to the source code, the memory 125 can also store training data. The training data includes a set of input data for applying to the neural network model 200 and a desired output from the neural network model for each respective dataset of the input data. The modelling framework 131 can be used to train the neural network model with the training data. An output of the training is the weights and biases that are associated with each node of the neural network model. After the neural network model is trained, the modelling framework 131 can be used to classify new data that is applied to the trained neural network model. Specifically, the trained neural network model uses the weights and biases obtained from training to perform classification and recognition tasks on data that has not been used to train the neural network model. The modelling framework 131 generally uses only the CPU 120 to execute the neural network model and so it may not achieve real-time performance for some classification tasks. The modelling framework 131 may also support using a GPU 122 to execute the neural network model, but the performance may still not reach real-time performance.

The compiler 132 analyzes the source code and data (e.g., the weights and biases learned from training the model) provided for a neural network model and transforms the model into a format that can be accelerated on the quantized emulator 140 and/or an optional neural network accelerator 180, which will be described in further detail below. Specifically, the compiler 132 transforms the source code into executable code, metadata, configuration data, and/or data structures for representing the neural network model and memory as neural network data 200. In some examples, the compiler 132 can divide the neural network model into portions (e.g., neural network 200) using the CPU 120 and/or the GPU 122) and other portions (e.g., a neural network subgraph) that can be executed on the neural network accelerator 180. The compiler 132 can generate executable code (e.g., runtime modules) for executing subgraphs assigned to the CPU 120 and for communicating with the subgraphs assigned to the optional accelerator 180. The compiler 132 can generate configuration data for the accelerator 180 that is used to configure accelerator resources to evaluate the subgraphs assigned to the optional accelerator 180. The compiler 132 can create data structures for storing values generated by the neural network model during execution and/or training and for communication between the CPU 120 and the accelerator 180. The compiler 132 can generate metadata that can be used to identify subgraphs, edge groupings, training data, and various other information about the neural network model during runtime. For example, the metadata can include information for interfacing between the different subgraphs of the neural network model.

The runtime environment 133 provides an executable environment or an interpreter that can be used to train the neural network model during a training mode and that can be used to evaluate the neural network model in training, inference, or classification modes. During the inference mode, input data can be applied to the neural network model inputs and the input data can be classified in accordance with the training of the neural network model. The input data can be archived data or real-time data.

The runtime environment 133 can include a deployment tool that, during a deployment mode, can be used to deploy or install all or a portion of the neural network to the quantization emulator 140. The runtime environment 133 can further include a scheduler that manages the execution of the different runtime modules and the communication between the runtime modules and the quantization emulator 140. Thus, the runtime environment 133 can be used to control the flow of data between nodes modeled on the normal-precision neural network module 130 and the quantization emulator 140.

The quantization emulator 140 receives normal-precision values 150 from the normal-precision neural network module 130. The normal-precision values can be represented in 16-, 32-, 64-bit, or other suitable floating-point format. For example, a portion of values representing the neural network can be received, including edge weights, activation values, or other suitable parameters for quantization. The normal-precision values 150 are provided to a normal-precision floating-point to quantized floating-point converter 152, which converts the normal-precision value into quantized values. Quantized floating-point operations 154 can then be performed on the quantized values. The quantized values can then be converted back to a normal-floating-point format using a quantized floating-point to normal-floating-point converter which produces normal-precision floating-point values.

The conversions between normal floating-point and quantized floating-point performed by the converters 152 and 156 are typically performed on sets of numbers represented as vectors or multi-dimensional matrices. In some examples, additional normal-precision operations 158, including operations that may be desirable in particular neural network implementations can be performed based on normal-precision formats including adding a bias to one or more nodes of a neural network, applying a hyperbolic tangent function or other such sigmoid function, or rectification functions (e.g., ReLU operations) to normal-precision values that are converted back from the quantized floating-point format.

In some examples, the quantized values are actually stored in memory as normal floating-point values. In other words, the quantization emulator 140 quantizes the inputs, weights, and activations for a neural network model, but the underlying operations are performed in normal floating-point. In other examples, the emulator provides full emulation of quantization, including only storing one copy of the shared exponent and operating with reduced mantissa widths. Some results may differ over versions where the underlying operations are performed in normal floating-point. For example, the full emulation version can check for underflow or overflow conditions for a limited, quantized bit width (e.g., 3, 4, or 5 bit wide mantissas).

The bulk of the computational cost of DNNs is in matrix-vector and matrix-matrix multiplications. These operations are quadratic in input sizes while operations such as bias add and activation functions are linear in input size. Thus, in some examples, quantization is only applied to matrix-vector multiplication operations, which will be eventually implemented on a NN hardware accelerator, such as a TPU or FPGA. In such examples, all other operations are done in a normal-precision format, such as float16. Thus, from the user or programmer's perspective, the quantization-enabled system 110 accepts and outputs normal-precision float16 values from/to the normal-precision neural network module 130 and output float16 format values. All conversions to and from block floating-point format can be hidden from the programmer or user. In some examples, the programmer or user may specify certain parameters for quantization operations. In other examples, quantization operations can take advantage of block floating-point format to reduce computation complexity, as discussed below regarding FIG. 3.

In certain examples, an optional neural network accelerator 180 is used to accelerate evaluation and/or training of neural network subgraphs, typically with increased speed and reduced latency that is not realized when evaluating the subgraph only on the quantized emulator 140. In the illustrated example, the accelerator includes a Tensor Processing Unit 182 and/or reconfigurable logic devices 184 (e.g., contained in one or more FPGAs or a programmable circuit fabric), however any suitable hardware accelerator can be used that models neural networks. The accelerator 180 can include configuration logic which provides a soft CPU. The soft CPU supervises operation of the accelerated subgraph on the accelerator 180 and can manage communications with the normal-precision neural network module 130 and/or the quantization emulator 140. The soft CPU can also be used to configure logic and to control loading and storing of data from RAM on the accelerator, for example in block RAM within an FPGA.

In some examples, the quantization emulator 140 is used to prototype training, inference, or classification of all or a portion of the neural network model 200. For example, quantization parameters can be selected based on accuracy or performance results obtained by prototyping the network within emulator 140. After a desired set of quantization parameters is selected, a quantized model can be programmed into the accelerator 180 for performing further operations. In some examples, the final quantized model implemented with the emulator 140 is identical to the quantized model that will be programmed into the accelerator 180. In other examples, the model programmed into the accelerator may be different in certain respects.

The compiler 132 and the runtime 133 provide a fast interface between the normal-precision neural network module 130, the quantization emulator 140, and (optionally) the accelerator 180. In effect, the user of the neural network model may be unaware that a portion of the model is being accelerated on the provided accelerator. For example, node values are typically propagated in a model by writing tensor values to a data structure including an identifier. The runtime 133 associates subgraph identifiers with the accelerator, and provides logic for translating the message to the accelerator, transparently writing values for weights, biases, and/or tensors to the quantization emulator 140, and/or (optionally) the accelerator 180, without program intervention. Similarly, values that are output by the quantization emulator 140, and (optionally) the accelerator 180 may be transparently sent back to the normal-precision neural network module 130 with a message including an identifier of a receiving node at the server and a payload that includes values such as weights, biases, and/or tensors that are sent back to the overall neural network model.

IV. Example Deep Neural Network Topology

Figure 2:
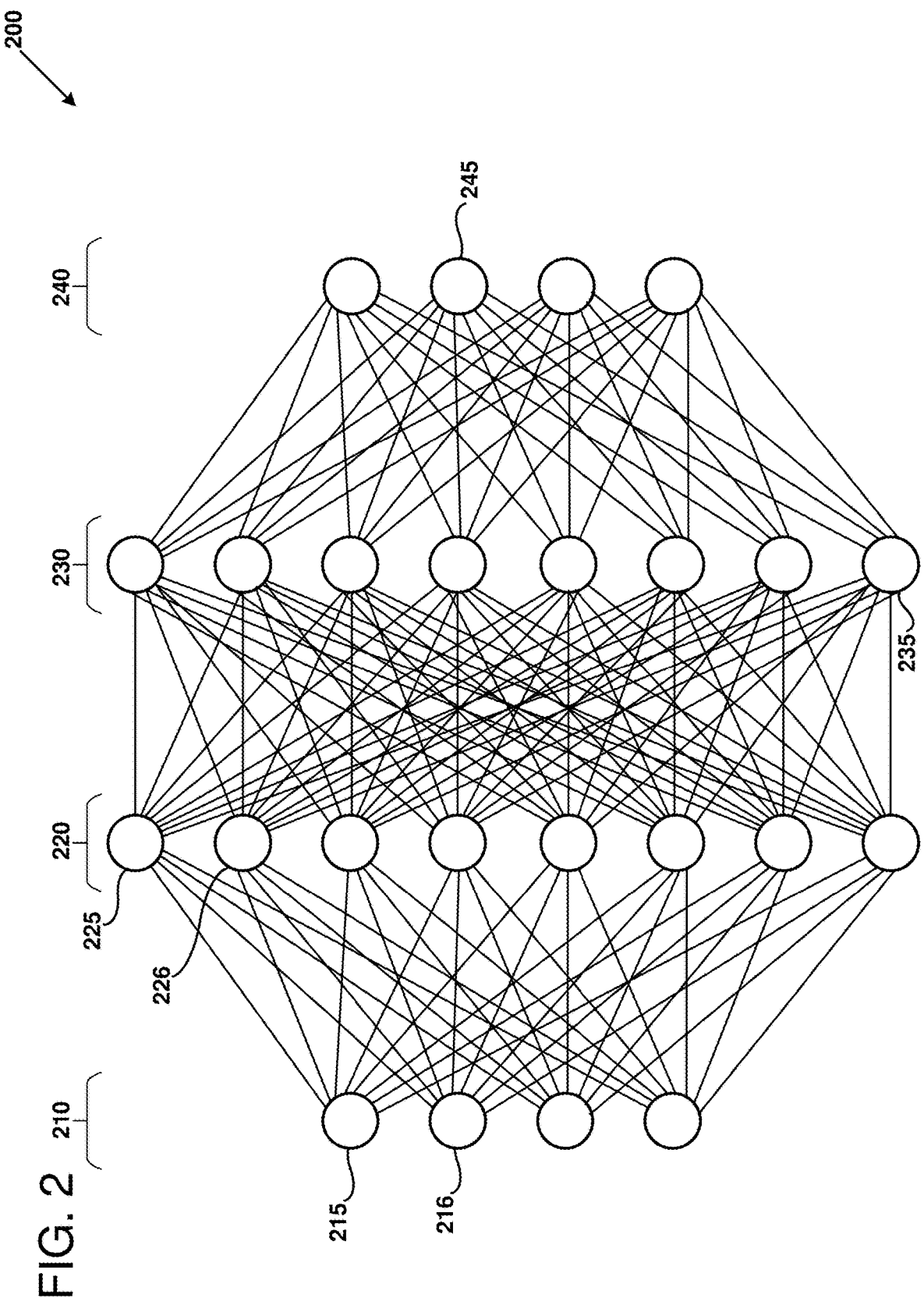
FIG. 2 is a diagram depicting a deep neural network, as can be modeled using certain example methods and apparatus disclosed herein.

FIG. 2 illustrates a simplified topology of a deep neural network (DNN) 200 that can be used to perform enhanced image processing using disclosed BFP implementations. One or more processing layers can be implemented using disclosed techniques for quantized and BFP matrix/vector operations, including the use of one or more of the plurality 210 of neural network cores in the quantization-enabled system 110 described above. It should be noted that applications of the neural network implementations disclosed herein are not limited to DNNs but can also be used with other types of neural networks, such as convolutional neural networks (CNNs), including implementations having Long Short Term Memory (LSTMs) or gated recurrent units (GRUs), or other suitable artificial neural networks that can be adapted to use BFP methods and apparatus disclosed herein.

As shown in FIG. 2, a first set 210 of nodes (including nodes 215 and 216) form an input layer. Each node of the set 210 is connected to each node in a first hidden layer formed from a second set 220 of nodes (including nodes 225 and 226). A second hidden layer is formed from a third set 230 of nodes, including node 235. An output layer is formed from a fourth set 240 of nodes (including node 245). In example 200, the nodes of a given layer are fully interconnected to the nodes of its neighboring layer(s). In other words, a layer can include nodes that have common inputs with the other nodes of the layer and/or provide outputs to common destinations of the other nodes of the layer. In other examples, a layer can include nodes that have a subset of common inputs with the other nodes of the layer and/or provide outputs to a subset of common destinations of the other nodes of the layer.

Each of the nodes produces an output by applying a weight to each input generated from the preceding node and collecting the weights to produce an output value. In some examples, each individual node can have an activation function and/or a bias applied. For example, any appropriately programmed processor or FPGA can be configured to implement the nodes in the depicted neural network 200. In some example neural networks, an activation function $f()$ of a hidden combinational node n can produce an output expressed mathematically as:

$$f(n) = \sum_{i=0} w_i x_i + b_i$$

where $w_i$ is a weight that is applied (multiplied) to an input edge $x_i$, plus a bias value $b_i$. In some examples, the activation function produces a continuous value (represented as a floating-point number) between 0 and 1. In some examples, the activation function produces a binary 1 or 0 value, depending on whether the summation is above or below a threshold.

Neural networks can be trained and retrained by adjusting constituent values of the activation function. For example, by adjusting weights $w_i$ or bias values $b_i$ for a node, the behavior of the neural network is adjusted by corresponding changes in the networks output tensor values. For example, a cost function C(w, b) can be used to find suitable weights and biases for the network and described mathematically as:

$$C(w, b) = \frac{1}{2n} \sum_x \|y(x) - a\|^2$$

where w and b represent all weights and biases, n is the number of training inputs, a is a vector of output values from the network for an input vector of training inputs x. By adjusting the network weights and biases, the cost function C can be driven to a goal value (e.g., to zero (0)) using various search techniques, for examples, stochastic gradient descent.

Examples of suitable applications for such neural network BFP implementations include, but are not limited to: performing image recognition, performing speech recognition, classifying images, translating speech to text and/or to other languages, facial or other biometric recognition, natural language processing, automated language translation, query processing in search engines, automatic content selection, analyzing email and other electronic documents, relationship management, biomedical informatics, identifying candidate biomolecules, providing recommendations, or other classification and artificial intelligence tasks.

In some examples, a set of parallel multiply-accumulate (MAC) units in each convolutional layer can be used to speed up the computation. Also, parallel multiplier units can be used in the fully-connected and dense-matrix multiplication stages. A parallel set of classifiers can also be used. Such parallelization methods have the potential to speed up the computation even further at the cost of added control complexity.

As will be readily understood to one of ordinary skill in the art having the benefit of the present disclosure, the application of neural network implementations can be used for different aspects of using neural networks, whether alone or in combination or subcombination with one another. For example, disclosed implementations can be used to implement neural network training via gradient descent and/or back propagation operations for a neural network. Further, disclosed implementations can be used for evaluation of neural networks.

V. Example Block Floating-Point Formats

Figure 3:
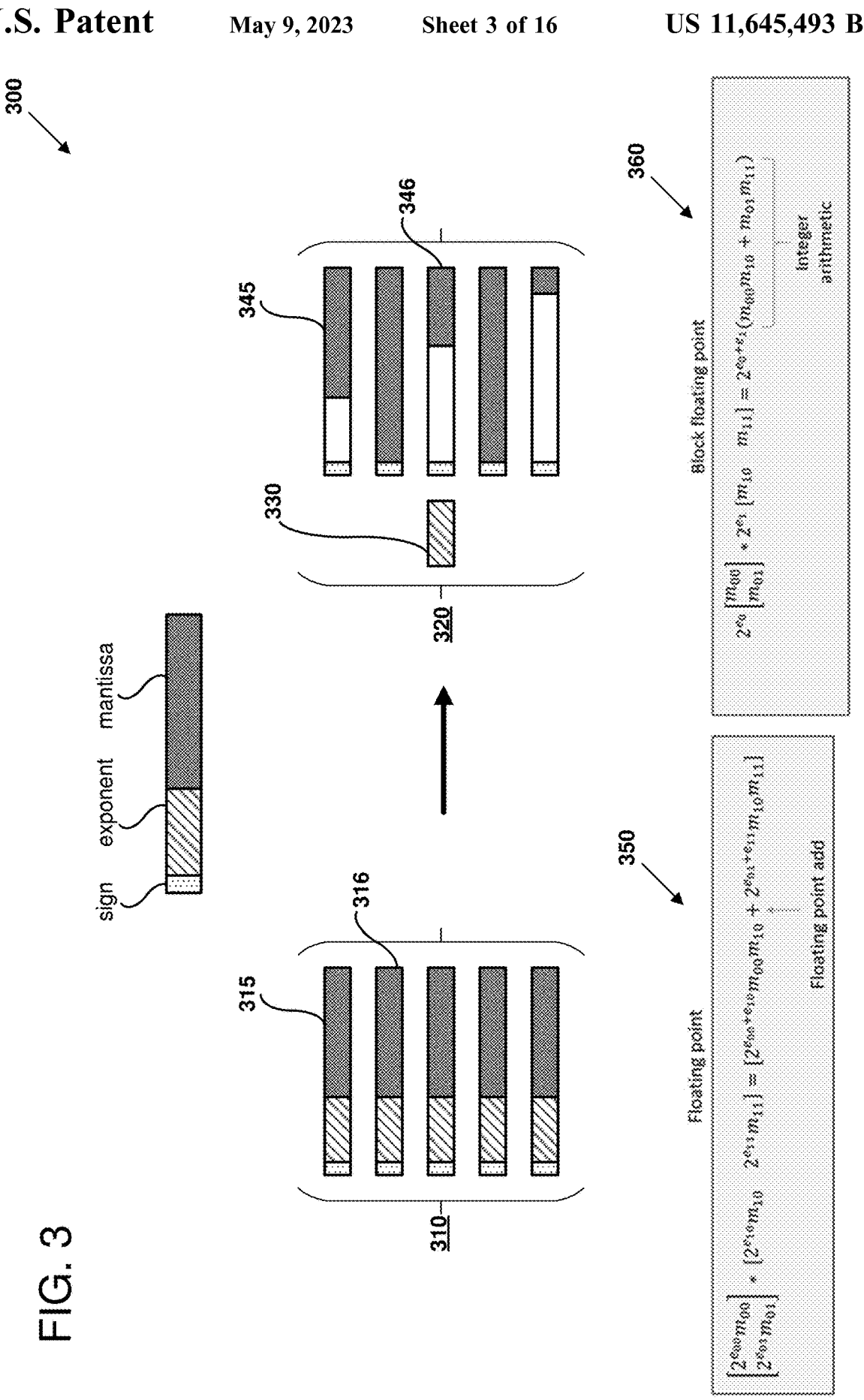
FIG. 3 is a diagram depicting certain aspects of converting a normal floating-point format to a quantized floating-point format, as can be performed in certain examples of the disclosed technology.

FIG. 3 is a diagram 300 illustrating an example of converting a normal floating-point format to a quantized, block floating-point format, as can be used in certain examples of the disclosed technology. For example, input tensors for a neural network represented as normal floating-point numbers (for example, in a 32-bit or 16-bit floating-point format) can be converted to the illustrated block floating-point format.

As shown, a number of normal floating-point format numbers 310 are represented such that each number for example number 315 or number 316 include a sign, an exponent, and a mantissa. For example, for IEEE 754 half precision floating-point format, the sign is represented using one bit, the exponent is represented using 5 bits, and the mantissa is represented using 10 bits. When the floating-point format numbers 310 in the neural network model 200 are converted to a set of quantized precision, block floating-point format numbers, there is one exponent value that is shared by all of the numbers of the illustrated set. Thus, as shown, the set of block floating-point numbers 320 are represented by a single exponent value 330, while each of the set of numbers includes a sign and a mantissa. However, since the illustrated set of numbers have different exponent values in the floating-point format, each number's respective mantissa may be shifted such that the same or a proximate number is represented in the quantized format (e.g., shifted mantissas 345 and 346).

Further, as shown in FIG. 3, use of block floating-point format can reduce computational resources required for certain common operations. In the illustrated example, a dot product of two floating-point vectors is illustrated in formal floating-point format (350) and in block floating-point format (360). For numbers represented in the normal-precision floating-point format operation 350, a floating-point addition is required to perform the dot product operation. In a dot product of floating-point vectors, the summation is performed in floating-point which can require shifts to align values with different exponents. On the other hand, for the block floating-point dot product operation 360, the product can be calculated using integer arithmetic to combine mantissa elements as shown. In other words, since the exponent portion can be factored in the block floating-point representation, multiplication in addition of the mantissas can be done entirely with fixed point or integer representations. As a result, large dynamic range for the set of numbers can be maintained with the shared exponent while reducing computational costs by using more integer arithmetic, instead of floating-point arithmetic. In some examples, operations performed by the quantization emulator 140 can be optimized to take advantage of block floating-point format.

In some examples, the shared exponent 330 is selected to be the largest exponent from among the original normal-precision numbers in the neural network model 200. In other examples, the shared exponent may be selected in a different manner, for example, by selecting an exponent that is a mean or median of the normal floating-point exponents, or by selecting an exponent to maximize dynamic range of values stored in the mantissas when their numbers are converted to the quantized number format. It should be noted that some bits of the quantized mantissas may be lost if the shared exponent and the value's original floating-point exponent are not the same. This occurs because the mantissa is shifted to correspond to the new, shared exponent.

VI. Example Alternatives for Tensor Values that Will Share and Exponent

There are several possible choices for which values in a block floating-point tensor will share an exponent. The simplest choice is for an entire matrix or vector to share an exponent. However, sharing an exponent over a finer granularity can reduce errors because it increases the likelihood of BFP numbers using a shared exponent that is closer to their original normal floating-point format exponent. Thus, loss of precision due to dropping mantissa bits (when shifting the mantissa to correspond to a shared exponent) can be reduced.

For example, consider multiplying a row-vector x by matrix W: y=xW. If an exponent is shared for each column of W, then each dot-product $xW_j$ (where $W_j$ is the j-th column of W only involves one shared exponent for x and one shared exponent for $W_j$.

FIG. 4 is a diagram 400 illustrating four alternative block floating-point formats, as can be used in certain examples of the disclosed technology. As shown, a first format 410 represents an entire array 420 of values that share a single exponent 425. In a second format 430, a common exponent is shared on a per-column basis. Thus, in this particular example, block floating-point values stored in even columns 431 of a matrix each share a first, single exponent 432. Block floating-point values stored in odd columns 435 each share a second, single exponent 437. In other examples, each column of an array can be associated with a different shared exponent. For an eleven-column tile in the alternative format, there can be eleven corresponding shared exponents, one shared exponent per column. In other examples, each row of an array can be associated with a different shared exponent, or odd and even rows can be associated with a shared common exponent.

A third format 450 is shown where groups of elements in an array share a common exponent. For example, if a 15×15 matrix of values shares in exponent according to the third format 450, a first set of 5×5 element groups 455 and 456 share a single shared exponent 458. Similarly, a second 5×5 element group of elements in the array 460 and 461 can each shared a second single exponent 468. In other examples, each of the tiles can be associated with its own respective shared exponent. In the example format 450, there could be nine shared exponents for the 15×15 matrix.

A fourth format 470 is shown where two shared exponents are shared on a tiling plus per-column basis. Thus, a first set of numbers including numbers 480, 481, and 485 all share a single common exponent 488. Similarly, a second set of numbers including a set 490 and 491 each share a second, different single exponent 495. In an alternative example, each of the groups shown can have its own respective exponent.

In some examples, the computational cost of matrix-vector multiplication can be further reduced by reducing mantissa widths. A large range of values having a shared common exponent can be expressed with only a few bits of mantissa. for example, in a representation with 4 bits of mantissa and a 5-bit exponent, values can be expressed in a range $[2^{-14}0.001_2, 2^{15}1.111_2]$, or approximately $[2^{-17}, 2^{16}]$. in contrast, a 4-bit fixed point number can only represent values in the range $[0001_2, 1111_2]$, or approximately $[2^0, 2^4]$.

VII. Example Use of Quantized Neural Network Model

Figure 5:
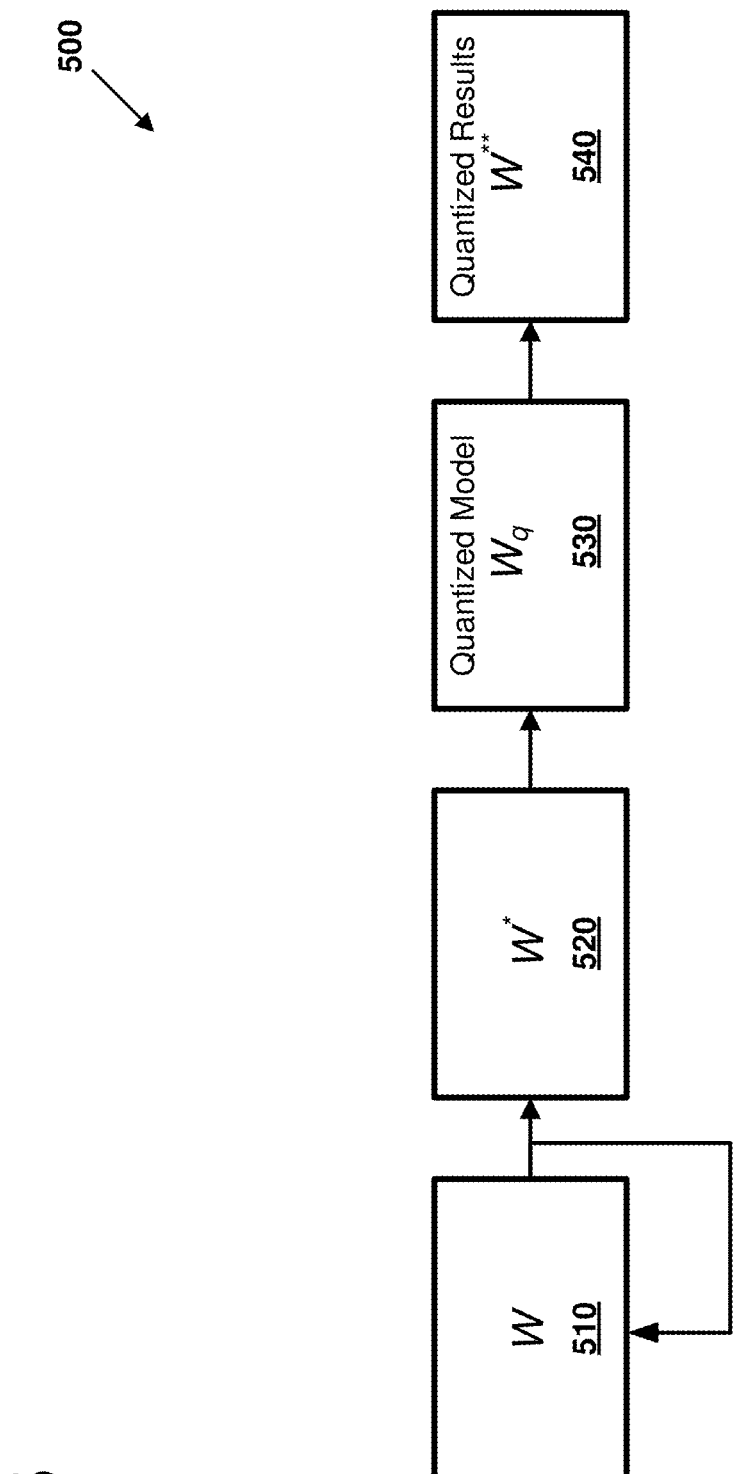
FIG. 5 is a diagram depicting a method of training a neural network for use with a quantized model, as can be implemented in certain examples of the disclosed technology.

FIG. 5 is a diagram 500 depicting a process of modeling a neural network using numbers stored in a quantized floating-point format, as can be performed in certain examples of the disclosed technology. For example, the quantization-enabled system 110 discussed above regarding FIG. 1 can be used to perform the illustrated modeling process.

As shown in FIG. 5, a neural network represented as a set of pre-trained model values W 510 is provided. The model 510 is trained using, for example, stochastic gradient descent, or other suitable model, producing a trained model W* 520. The pre-trained model W 510 can be designed and trained using normal-precision floating-point numbers. After the neural network has been trained, at least a portion of the neural network trained model W* 520 (comprising one or more input tensor) is converted from its normal-precision floating-point format into a set of quantized precision format numbers. As part of the converting, both model parameters as well as activation values in the neural network are quantized. This converting produces the quantized model $W_q$ 530. In some examples, a block floating-point model including at least one single shared exponent is used to represent the quantized precision format numbers. In some examples, a shared exponent is used for the entire tensor. In some examples, a shared exponent is used for two or more columns, two or more rows, or all elements or tiles within an entire tensor. One or more operations can be performed with the set of quantized precision format numbers, for example, inference operations. In some examples, the quantized model 530 is emulated by storing the quantized precision numbers as normal-precision floating-point numbers. As operations are performed with the quantized numbers stored as normal-precision numbers, the modified set of quantized precision format numbers will mimic behavior of a neural network when it is implemented using a hardware accelerator or an FPGA. In other examples, the quantized numbers are stored in the quantized precision format and subsequent operations are emulated using, for example, block floating-point representations with the general-purpose processor.

Performing the operations with the set of quantized precision format numbers produces a modified set of quantized precision format numbers, which are produced as quantized results W 540. The quantized results can be used to evaluate the effect of quantization on the neural network model. For example, inference validation can be used to compare an expected output for the neural network with the output that is produced using the quantized model $W_q$ 530. Additionally, new data sets not used in the training of the model W 510** can be used to determine accuracy of the quantized model.

Figure 6:
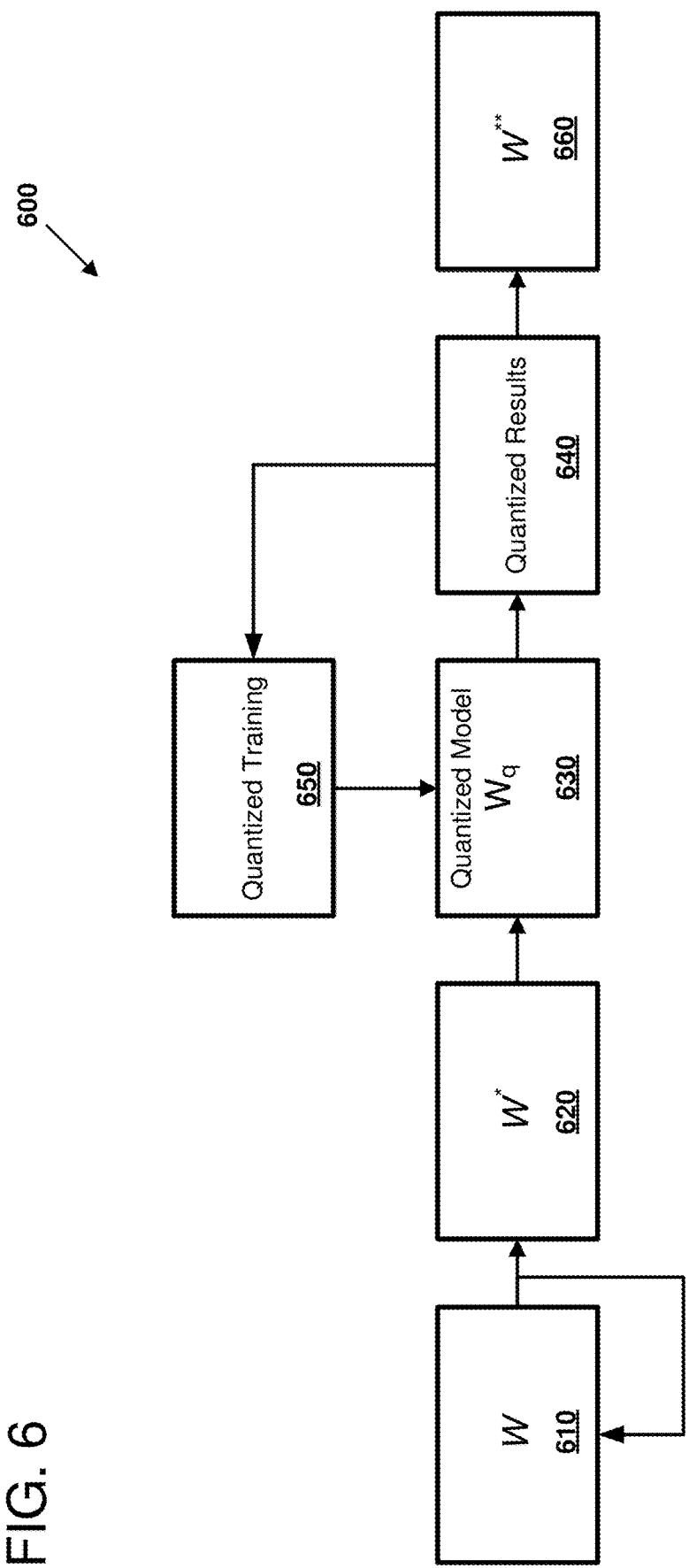
FIG. 6 is a diagram depicting a method of training a neural network for use with a quantized model, including quantized training, as can be implemented in certain examples of the disclosed technology.

VIII. Example Use of Quantized Neural Network Model with Quantized Retraining FIG. 6 is a diagram 600 depicting an example of using a quantized neural network model with additional, quantized training. As shown, an input neural network model W 610 is represented as a set of pre-trained model parameters, which has been trained using a normal floating-point representation, to produce a trained neural network model W*, in a similar manner to that discussed above regarding FIG. 5. This trained model W* 620 is quantized to produce a quantized model $W_q$ 630. For example, block floating-point numbers can be used to represent neural network nodes and edges in the quantized model 630. In some examples, one or more aspects of the quantization process can be specified by a user or programmer One or more operations are performed with the quantized model 630, thereby producing quantized results 640. The quantized results can be evaluated by performing inference evaluation with inputs that were used to train the input neural network model W 610. In addition or alternatively, the quantized results 640 can be evaluated by providing new input data to the quantized model 630, and evaluating the accuracy of the results. It should be noted that evaluation of the accuracy of the quantized model can be performed by evaluating the output of the neural model itself, and not by comparing errors within edges or node weights of the neural network.

A programmer or user may determine that the accuracy of the quantized model should be improved. In such a case, quantized training 650 can be performed using the quantized results 640 to fine-tune the quantized model 630. This fine-tuning can be performed by evaluating training data with the quantized model 630 and using losses (or error) from the quantized model in comparison to the normal floating-point based model further train the model. In some examples, parameters used for the fine-tuning training are varied from that used for the floating-point training performed to produce the trained neural network W* 620. For example, the learning rate of the network may be reduced when performing fine-tuning as part of the quantized training 650. After at least one round of fine-tuning to produce an updated quantized model 630, an updated quantized model W 660 is produced. This updated quantized model 660** can be used to evaluate how the trained model will perform one provided to a neural network hardware accelerator.

Similar to the discussion above regarding FIG. 5, the quantized values may actually be stored in memory as floating-point numbers, but that have been modified to appear quantized to the underlying neural network run time. In some examples, the quantized values are actually stored in memory as block floating-point numbers, and a library of neural network operations as provided to operate on the quantized values as if the neural network was implemented using a hardware accelerator.

IX. Example of Quantized Training

Figure 7:
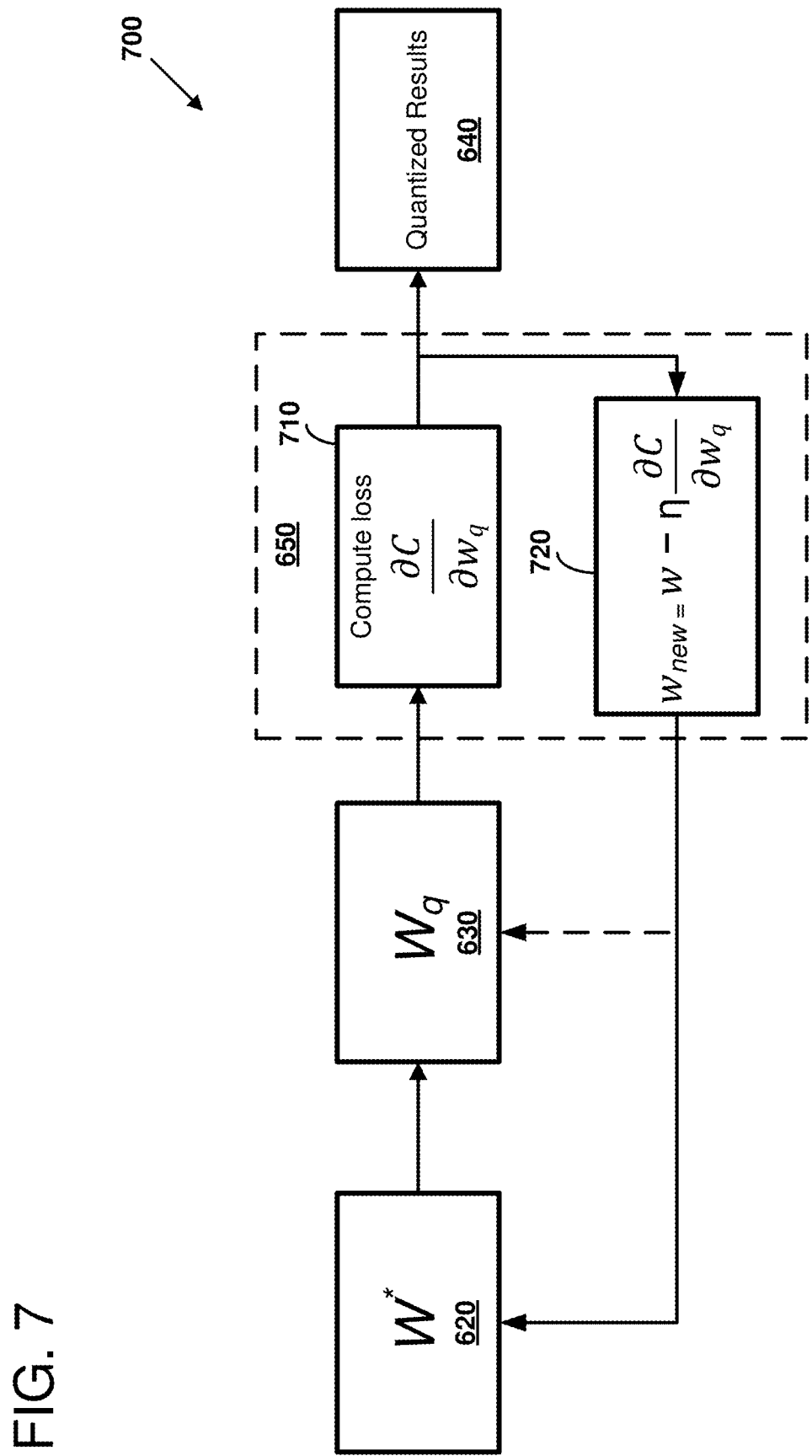
FIG. 7 is a diagram further detailing methods for performing quantized training, as can be implemented in certain examples of the disclosed technology.

FIG. 7 is a diagram 700 further detailing aspects of quantized training, as can be performed in certain examples of the disclosed technology. For example, the illustrated quantized training can be used to implement the quantized training 650 discussed above regarding FIG. 6. As shown, a quantized floating-point model 630 is provided for quantized training. Loss is computed at 710 for forward-pass training using the quantized model 630. A gradient of the error is computed with respect to the quantized model 630. These accumulated gradients are used at 720 to provide updated values for the quantized floating-point model. During back propagation, a straight-through estimator is used for the gradients of the quantization operators. In other words, back-propagation is performed using identity operators instead of derivatives of the forward pass operation.

The fine-tuned quantized neural network model is used to produce quantized results 640. These results are evaluated to determine whether the quantized neural network model has sufficient accuracy for a particular application. If it is determined that the quantized model does not provide enough accuracy, even after performing quantized training, other steps can be taken to improve the network accuracy. For example, the bit width used to store mantissas or exponents in the quantized model can be increased. In some examples, different methods of assigning shared exponents can be used. For example, instead of using a single shared exponent for an entire array, multiple shared exponents may be used on a per-row, a per-column, or a per-tile basis. In some examples, it may be determined that certain portions of the neural network should be implemented with normal-precision floating-point using a general-purpose CPU in the final model, and only other portions of the neural network model are quantized and implemented using a hardware accelerator.

X. Additional Aspects of Quantized Modeling

Parameters and methods of performing quantization can be varied in a number of different ways. For example, the number of bits used to represent a mantissa or an exponent can be varied. In some examples, a tensor is converted to a block floating-point format where at least two elements of the tensor share a single, common exponent. In some examples, in order to handle shared exponents over granulate finer than the entire tensor, the tensor can be reshaped or split into smaller tensors before applying quantization operations. Such reshaping allows for the operations to be applied independently along certain axes while splitting allows for the following operations to be applied independently for each of the split tensors.

In some examples, a shared exponent for a tensor or a split tensor can be selected in a number of different ways. For example, a shared exponent e for a group of values can be selected as the exponent of the largest absolute value m of the group of values (e.g., a vector) x:

$$m = \max(\text{abs}(x))$$

After determining the largest absolute value for the group, the shared floating-point exponent of the value $e_{shared}$ can be determined using the following relation:

$$e_{shared} = \text{floor}(\log_2 m)$$

In some examples, the shared exponent can be determined in other ways. For example, if some amount of overflow or underflow is acceptable for a particular application, an exponent not based on the largest absolute value for the group can be selected. For example, an exponent can be selected such that accuracy of the representation is improved overall, or according to another metric.

In some examples, the mantissa width can be selected for the selected shared exponent as follows. A floating-point number is re-scaled such that mantissa bits that will be kept in the block floating-point representation are expressed in the integer portion of the scale value. The scale value is then rounded to remove fractional bits, and then scaling is reversed. These operations can be expressed for a selected shared exponent e, sign and mantissa bits to be retained b, and a vector x of tensor values:

$$\text{scale} = 2^{b-2-e}$$
$$x = x * \text{scale}$$
$$x = \text{round}(x)$$
$$x = \text{clip}(x, -2^{b-1} + 1, 2^{b-1} - 1)$$
$$x = \frac{x}{\text{scale}}$$

In some examples, a quantization API or library can be provided to facilitate conversion of neural network tensors between normal-precision floating-point and quantized-precision format.

In some examples, interfaces to quantized operators are provided that replicate or closely match corresponding interfaces for a normal-precision floating-point library. A programmer can easily access the quantized operators by, for example, changing the name of a class used for function calls, or redefining or overloading methods of a class in an object oriented scheme.

A number of different quantization parameters can be selected. These include bit widths for node weights, for example 3, 4, or 5 bits for values; bit widths for input or activation values for a neural network, for example 3, 4, or 5 bits for representing values; a format to use for operators on non-quantized paths in the model (e.g., 16- or 32-bit floating-point); and/or parameters to specify quantized operation, for example a parameter to specify whether a one-dimensional or two-dimensional colonel should be flattened before quantization.

Additional parameters can be specified using a programming interface to control details of the quantization scheme. For example, the size of a tile or group of numbers that shares a particular single exponent, restricting exponent sharing to rows or columns for weights, or methods for selecting a shared exponent. For example, exponent sharing can be limited to rows of a tensor for activation values and columns of the tensor for weight values. As another example, the shared exponent selection method can be selection of the exponent of the absolute maximum value in the matrix, or another value based on statistical distribution of node values in the neural network.

XI. Example Convolution Operations

Figure 8:
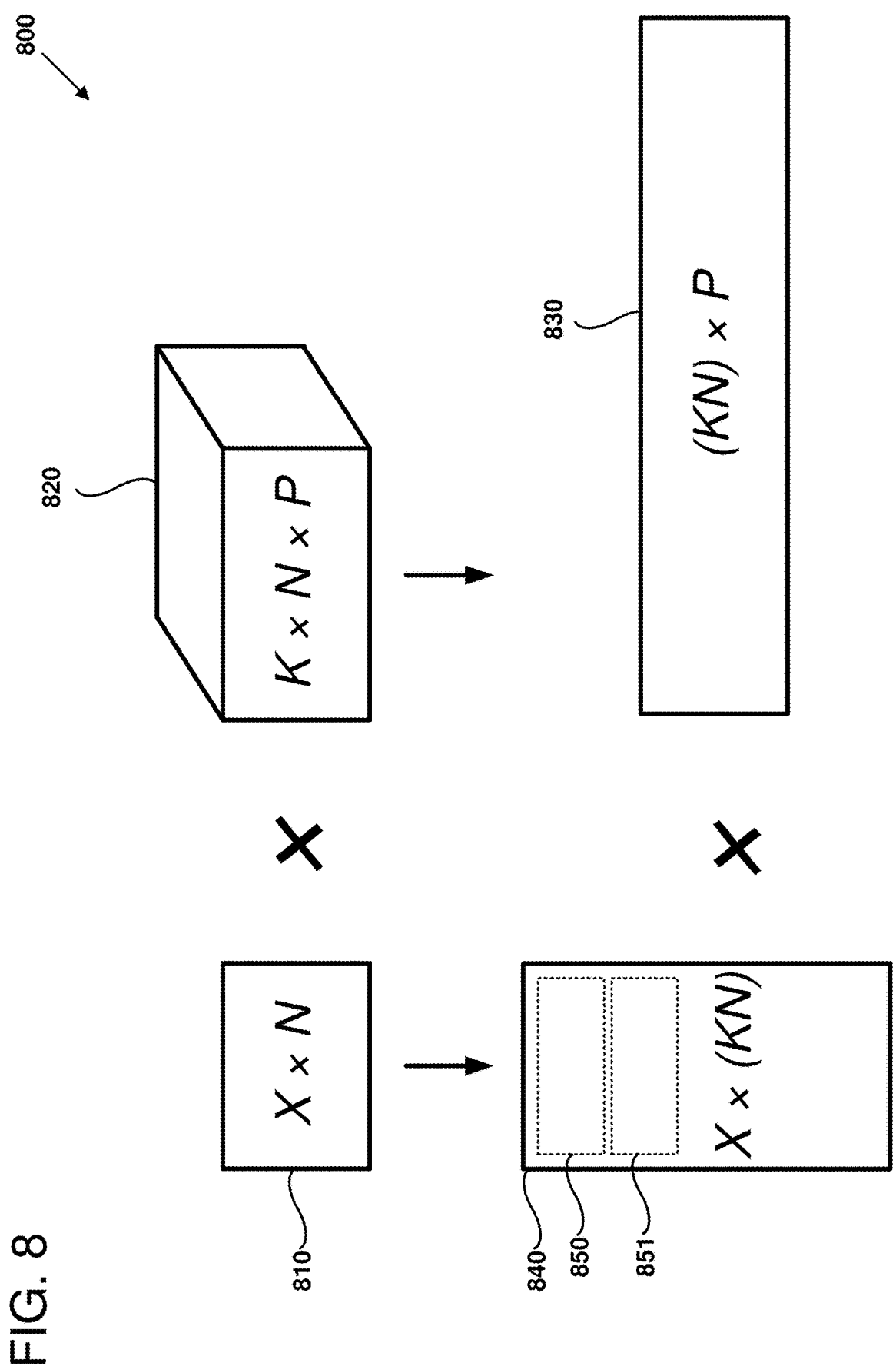
FIG. 8 is a diagram depicting tensor flattening operations, as can be performed in certain examples of the disclosed technology.

FIG. 8 is a diagram 800 illustrating an example of performing a one-dimensional convolution operation, as can be performed in certain examples of the disclosed technology. For example, operations performed on quantized models such as those discussed above regarding FIGS. 5-7 can include use of one-dimensional or two-dimensional convolutions.

For a one-dimensional convolution, a two-dimensional input tensor 810 (dimensions X, N, where N is the number of input channels) and a three-dimensional convolution kernel tensor 820 (dimensions K, N, P, where K is the kernel_size, N is the number of input channels, and P is the number of output channels) are provided as quantized matrices. The convolution kernel is "flattened" into a 2-D matrix 830 with two dimensions (K·N and P). The input is converted into a 2-D matrix 840 where each row (e.g., rows 850 or 851) is a K·N window of the original input. Quantization is applied to each of these matrices, with a selected tiling of their respective shared exponents. For example, the fourth format 470 may be applied to achieve a selected level of accuracy and computational effort.

For a two-dimensional convolution, a similar procedure as for the one-dimensional convolution illustrated in FIG. 8 can be used. For example a three-dimensional input tensor (X, Y, N) can have an operation applied using a four-dimensional convolution kernel (K, L, N, and P). The input is flattened into a two-dimensional matrix where each row is a K·L·N window of the original input tensor. The convolutional kernel is flattened into a two-dimensional matrix having dimensions (K·L·N and P). as with the one-dimensional convolution discussed above, quantization can be applied to each of these matrices using selected quantization parameters. For example, the fourth format 470 may be applied to achieve a selected level of accuracy and computational effort.

In alternate examples, where the number of input channels is equal to the tile size, convolution may be performed without flattening the kernels. Instead, an exponent is shared per pixel of the kernels. For the input tensor this is an exponent per input. This can also be performed in a similar fashion when the number of input channels is greater than the tile size by limiting exponents to vectors in each pixel having a length equal to the tile size. This can be applied when the number of input channels is less than tile size by padding out the pixels to the tile size with a constant value for example 0 or a one. This may be desirable in some applications, as flattening convolutions for matrix multiplication incurs an additional cost.

Figure 9:
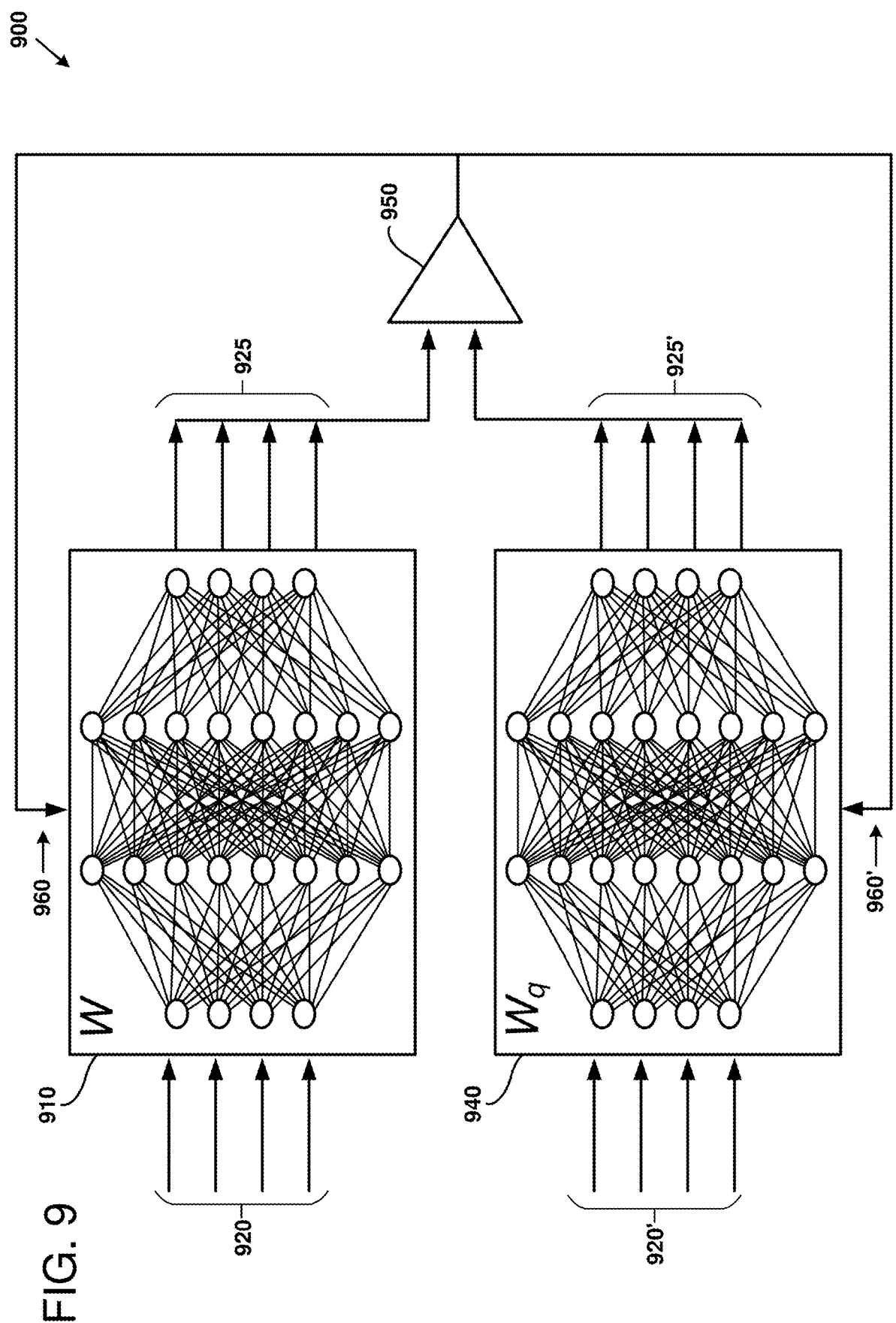
FIG. 9 is a diagram illustrating an example implementation of a design flow for generating quantized neural network models, as can be implemented in certain examples of the disclosed technology.

XII. Example of Comparing Normal-Precision to Quantized-Precision Neural Network Outputs FIG. 9 is a diagram 900 illustrating an example implementation of a design flow for generating quantized neural network models, as can be implemented in certain examples of the disclosed technology. For example, the quantization system 110 discussed above regarding FIG. 1 can be adapted to provide the example implementation.

A normal-precision neural network model W 910 is shown that has been retrained. An input tensor 920 is applied to an input layer of the normal-precision neural network model W 910, and a corresponding output tensor 925 is produced. In some examples, the neural network model 910 may have been received at a quantization system in a pre-trained state. In other words, weights, activation values, and bias values for the neural network, as well as output sigmoid functions are received as a pre-trained model. In some examples, the neural network model 910 may be generated anew by creating a neural network and proceeding through a training process. A set of test factors, including a set of input tensors and corresponding output tensors generated by the trained neural network are generated and stored for comparison.

FIG. 9 also shows a quantized precision neural network model $W_q$ 940. The quantized precision neural network model 940 can be stored in a block floating-point format representation. For example, the quantized neural network model 940 can be generated by converting weights, activation values, biases, and other values of the normal-precision neural network model W 910 to a block floating-point format using techniques such as those discussed above. The set of test vectors used to evaluate the normal-precision neural network model 910 can be applied to the quantized precision neural network model 940. Output tensors generated by the quantized neural network model are provided to a comparison unit 950 that compares the normal-precision output tensors to the quantized precision output tensors. In some examples, metrics can be generated based on, for example, the number of output tensors that have an exact match, a macro-average score for the comparison, based on Hamming distances between the two output tensors, or by other suitable comparison techniques.

Based on the results of the comparison, the normal-precision neural network model 910 and/or the quantized precision neural network model 940 may be retrained, have its hyperparameters adjusted, and/or have quantization parameters of the quantized precision neural network adjusted (960 and 960'). Hyperparameters, which are parameters selected before training or retraining a neural network model that determine structure of a neural network or how the neural network is trained, can be selected based on the comparison.

The quantized neural network can be retrained by adjusting one or more training parameters that were used to train the normal-precision neural network and then training the quantized neural network with the adjusted training parameters. Examples of suitable training parameters that can be adjusted include batch size, momentum value, number of training epochs, or dropout rate. Batch size refers to the number of sets of input tensors that are applied during training or retraining. Thus, increasing batch size may improve training results. Momentum value refers to a term in an objective function used during learning that adjusts the size of a step taken in trying to find a local minima in an optimization problem. For example, when using stochastic gradient descent to train a neural network, the momentum value can be adjusted to attempt to avoid the stochastic search from being "stuck" at a non-optimal local minima. Dropout rate refers to the rate at which some nodes of the neural network may ignore or underweight connections to certain other nodes in order to reduce the number of connections in the neural network. Learning rate refers to the rate at which optimization operations attempt to converge to a solution.

In some examples, the adjusted training parameter for retraining a quantized neural network may be selected to have an overall lower training rate. This reflects an assumption that the normal-precision neural network model may already be close to a desirable set of values, and additional retraining should be directed to re-converging behavior of the network to correct for changes induced by quantizing values in the neural network.

In some examples, the normal-precision or the quantized precision neural network models can have one or more node weights sparsified. This can be implemented by eliminating edges between one or more nodes of the neural network. For example, very low or zero weights can be assigned to edges input to a particular neural network node. In other examples, connections between nodes can be deleted from the neural network model data structure.

Other examples of hyperparameters that can be adjusted include the number of hidden layers in the normal-precision neural network, a number of nodes in an input layer or an output layer of the network, a node type for a layer of the normal-precision neural network (e.g., combinational nodes, or nodes having state variables, such as GRUs or LSTMs), or a learning rate for training the neural network.

In some examples, the result of comparing the normal-precision neural network model output tensor to the quantized precision neural network model output tensor can be used to select a different quantized precision format having at least one quantization parameter that is different than the previous quantization format used to generate the original quantized neural network. For example, when the quantized precision neural network model uses block floating-point representations, quantization parameters of the neural network such as bit widths used to represent note weights, note activation values, note bias values, or other network parameters can be increased or decreased. Further, tile sizes, or tiling arrangements for associating neural network values with a shared exponent can be selected. For example, the number of shared exponents can be increased, or a different tiling scheme selected in order to attempt to improve output achieved with the quantized neural network model. In some examples, one or more different quantization parameters can be selected including at least one or more of the following: a bit width used to represent bit widths of node weight mantissas, a bit width used to represent bit widths of node weight exponents, a bit width used to represent bit widths of activation value mantissas, a bit width used to represent bit widths of activation value exponents, a tile size for a shared exponent, a parameter to share an exponent on a per-row basis, a parameter to share an exponent on a per-column basis, or a parameter specifying a method of common exponent selection.

Figure 10:
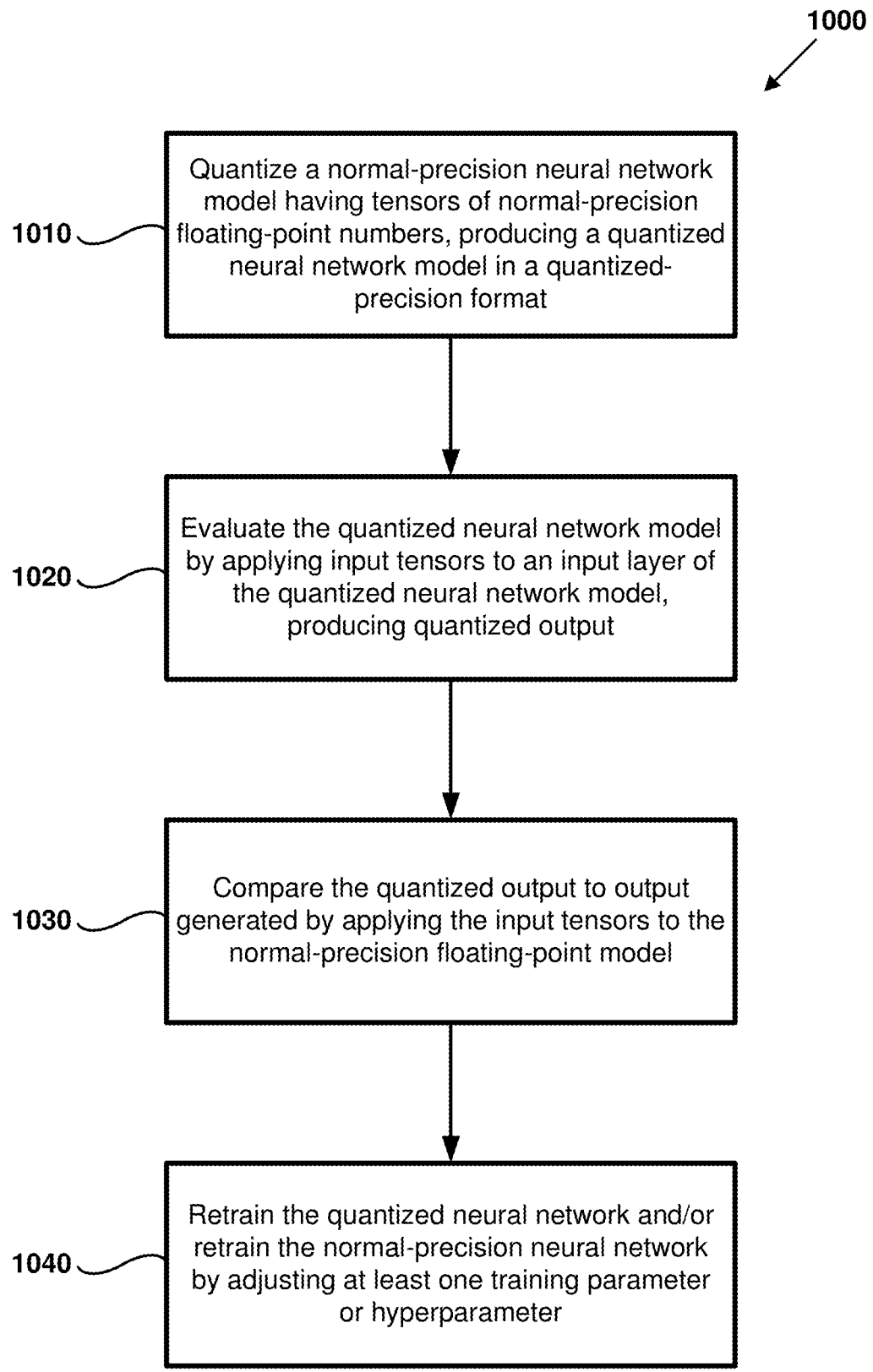
FIG. 10 is a flow chart outlining an example method of comparing quantized model output and retraining a neural network, as can be implemented in certain examples of the disclosed technology.

XIII. Example Method of Retraining Neural Network with Adjusted Training and/or Hyperparameters FIG. 10 is a flow chart 1000 outlining an example method of comparing quantized model output to normal-precision model output and retraining a neural network by adjusting a parameter, as can be implemented in certain examples of the disclosed technology. For example, the example quantization system discussed above regarding FIG. 1 can be used to implement the illustrated method.

At process block 1010, a normal-precision neural network model is provided. In some examples, the neural network model may be received from a different computer system than the system on which the method is implemented. In some examples, a programmer or data scientist can generate and train the neural network model on the same system prior to quantization. The normal-precision neural network model can be quantize by, for example, converting tensors representing weights, activation values, biases, or other neural network values for tensors two a block floating-point format. For example, values in a 16- or 32-bit floating-point format tensor can be converted to a three-, four-, five-, six-bit, or other bit width mantissa and share a single, common exponent. In some examples, two or more exponents are shared with groups of values and a tensor. For example, exponents can be shared on a per-row, per-column, or other suitable tiling arrangement.

At process block 1020, the quantized neural network can be evaluated by applying input tensors to an input layer of the quantized neural network model to produce quantized output. For example, the quantized output can be represented as a vector or an array of values.

At process block 1030, the quantized output is compared to output generated by applying the same input tensors as used at process block 1020 the normal-precision floating-point model. For example, a batch of test input tensor values can be applied to both the normal-precision neural network model and the quantized precision neural network model and the resulting output tensors compared. Some examples, a metric can be formed from the comparison. For example, the number of exact matches between sets of test input tensor values can be generated. In some examples, a score is assigned indicating how closely the normal-precision and quantized output tensor values match. In some examples, a macro-average score for comparison is generated.

At process block 1040, the quantized neural network and/or the normal-precision neural network is retrained by adjusting a parameter of the respective network. For example, the normal-precision neural network can have one or more training parameters adjusted, and a retraining process applied to the neural network. Examples of suitable training parameters that can be adjusted to include batch size, momentum value, number of training epochs, dropout rate, or sparsification. Further, quantization parameters used to control how the quantized neural network is configured can be adjusted as well. For example, the bit width of mantissas or exponents used to represent the quantized neural network can be adjusted. Further, number, selection, and assignment of shared exponents to values in a block floating-point representation can be adjusted.

XIV. Example Method of Adjusting Quantization Parameters

Figure 11:
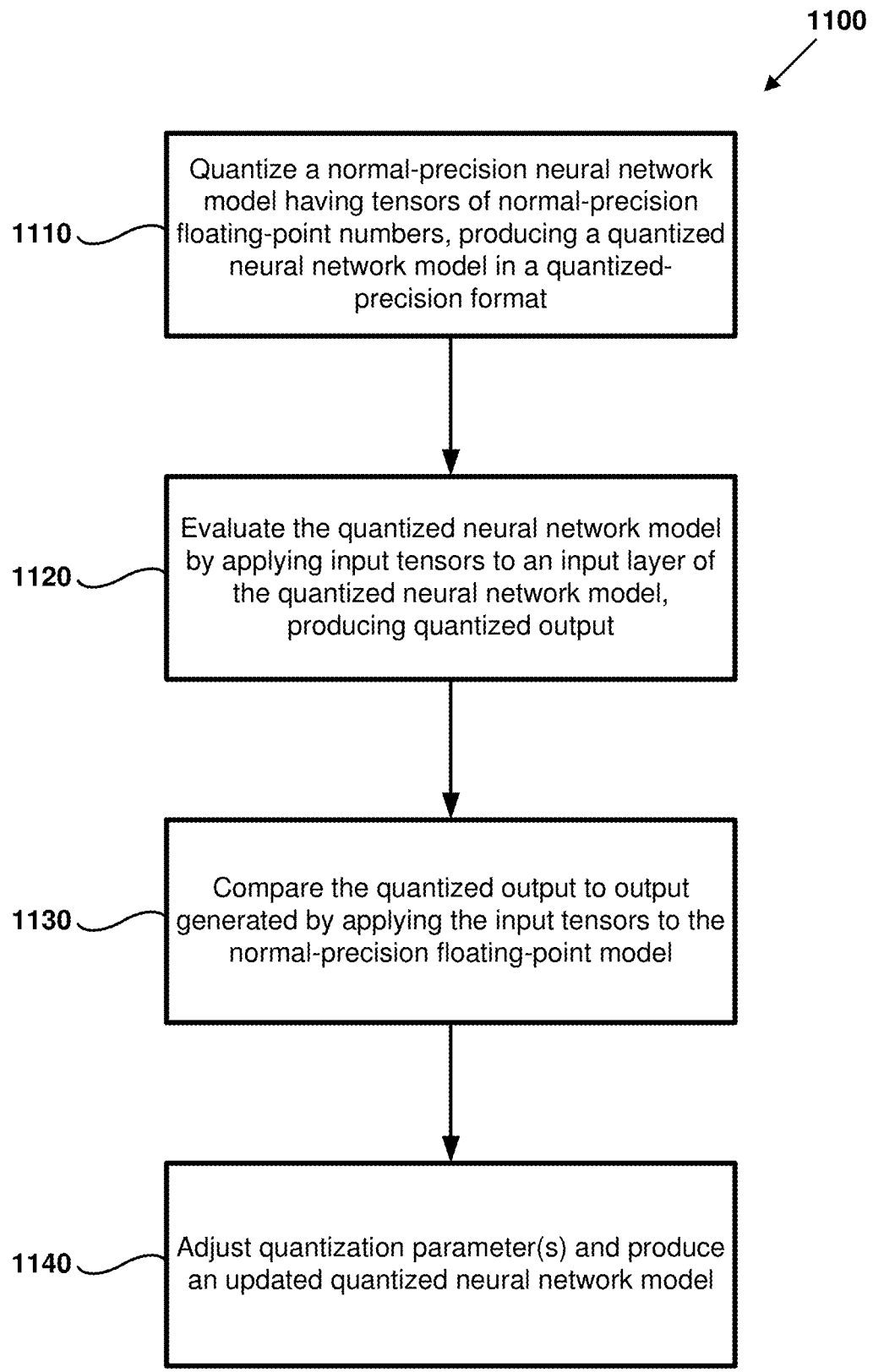
FIG. 11 is a flow chart outlining an example method of adjusting quantization parameters for a quantized neural network model, as can be performed in certain examples of the disclosed technology.

FIG. 11 is a flow chart 1100 outlining an example method of adjusting quantization parameters for a quantized neural network model, as can be performed in certain examples of the disclosed technology. For example, the example quantization system discussed above regarding FIG. 1 can be used to perform the illustrated method.

At process block 1110, a normal-precision neural network model having tensors of normal-precision floating-point numbers is quantized. For example, the model can be quantize by converting normal-precision floating-point numbers representing the tensors to a block floating-point format. For example, the normal-precision neural network model can be received over a computer network or via computer storage and quantized using an appropriately configured computer system. In some examples, the normal-precision neural network can be generated on the same computer system implementing the illustrated method.

At process block 1120, the quantized neural network model produced at process block 1110 is evaluated by applying input tensors to an input layer of the quantized neural network model. The computer system implementing the model will forward-propagate the input values through the neural network to the output layer. The values produced at the output of the quantized neural network model are referred to as quantized output tensors.

At process block 1130, the quantized output produced at process block 1120 is compared to output generated by applying the input tensors used at process block 1122 the pre-quantized normal-precision floating-point model. For example, a number of exact output matches, or matches having a defined number of matches can be used to determine whether the outputs sufficiently match each other. In other examples, other metrics can be used to evaluate how closely the behavior of the quantized model matches the behavior of the normal-precision model.

At process block 1140, quantization parameters are adjusted and used to produce an updated quantized neural network model. In some examples, existing weights, activation values, biases, and other such values representing the quantized neural network model can be updated based on the comparison. For example, if the comparison indicates that precision of the model should be increased, then the bit width of mantissas or exponents used in the model can be increased, for example from four bits to five bits or six bits. As another example, the groupings and number of shared exponents for a tensor in the quantized model can be adjusted. For example, by providing a finer grain set of exponents, behavior of the quantized model may be increased. As another example, if the comparison indicates that the output of the quantized model is satisfactory, then the quantization parameters can be selected that may possibly reduce accuracy v. the original quantized model. For example, a bit width used represent mantissas or exponents can be reduced, if sufficient accuracy is realized. As another example, the number or assignment of shared exponents in a block floating-point format can be adjusted. In other examples, the adjusted quantization parameters are used to generate a new quantized neural network from the normal-precision neural network.

XV. Example Method of Configuring Hardware Accelerator

Figure 12:
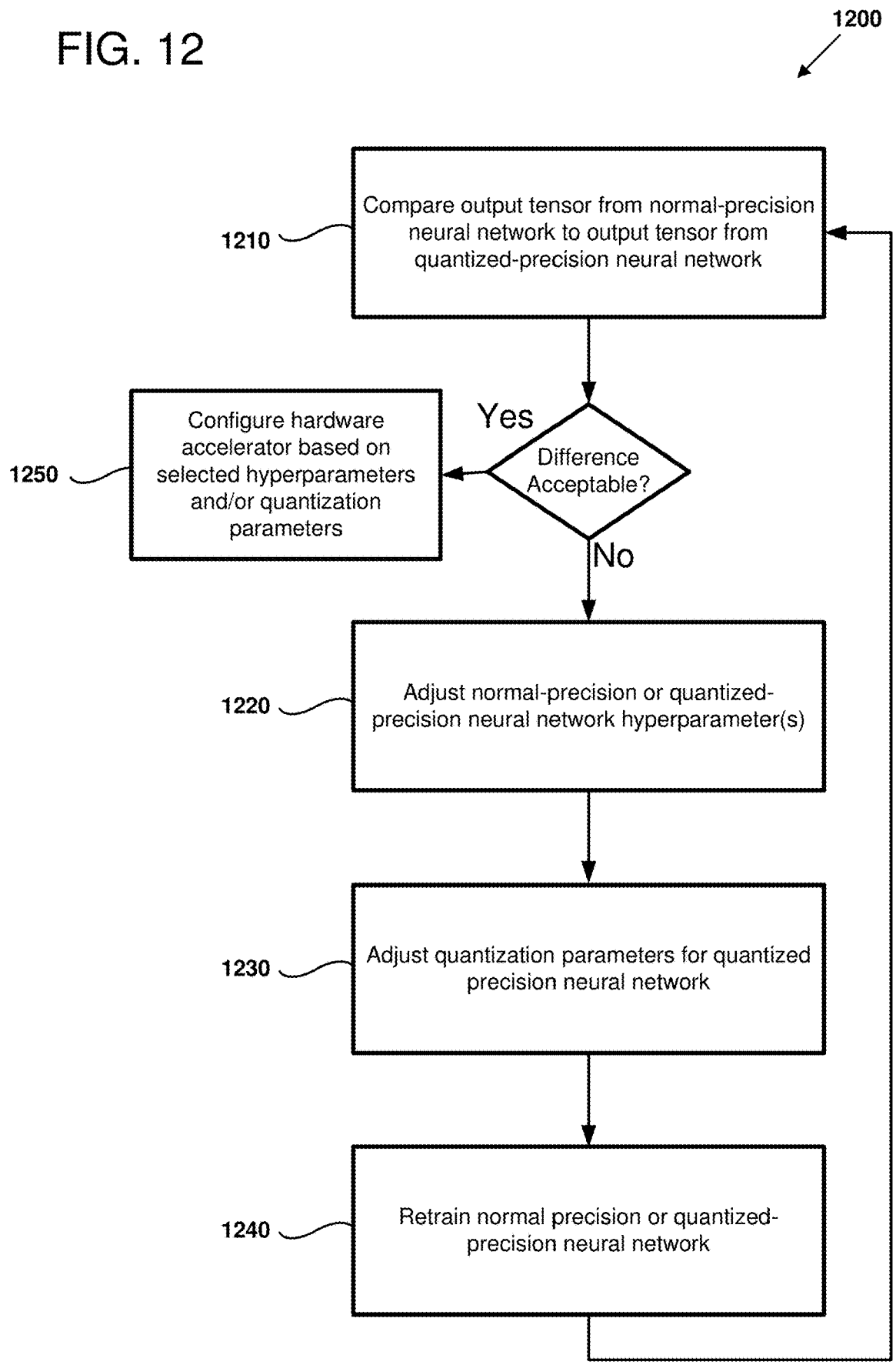
FIG. 12 is a flow chart outlining an example method of configuring a quantized-precision neural network and configuring a hardware accelerator based on adjusted hyperparameters and/or quantization parameters, as can be performed in certain examples of the disclosed technology.

FIG. 12 is a flow chart 1200 outlining an example method of configuring a quantized Precision neural network and configuring the hardware accelerator based on selected neural network hyperparameters and/or quantization parameters, as can be performed in certain examples of the disclosed technology. For example, the quantization enabled system 110 discussed above regarding FIG. 1 can be used to implement the outlined method.

At process block 1210, one or more output tensors produced by a normal-precision neural network are compared to corresponding output tensors produced by a quantized precision neural network. The quantized precision neural network is generated by applying quantization parameters to the normal-precision neural network, for example by converting the normal-precision neural network to a block floating-point format. The output tensors can be compared by identifying exact matches between output for a given input tensor, by comparing metrics to identify similar matches between output tensors, or by another suitable method. Based on the comparison, it is determined whether the difference between the output tensors from the normal-precision neural network and the quantized precision neural network are close enough to be acceptable for a particular application. If it is determined that the differences are not acceptable, then the method proceeds to process block 1220.

At process block 1220, hyperparameters for the normal-precision neural network or the quantized precision neural network can be adjusted. Hyperparameters are parameters that are selected before training or retraining neural network model that determine structure of a neural network or aspects of how the neural network is trained. Examples of suitable training hyperparameters include batch size, momentum values, number of training epochs, or dropout rate. Examples of hyperparameters that determine structure of a neural network include the number of nodes in a neural network, the number of hidden layers, the number of nodes in an input layer or a output layer, no types for the neural network, or amount of connections between nodes and a network. In some examples, the neural network may be sparsified by assigning zero weights to connections for certain nodes in the neural network.

At process block 1230, quantization parameters for the quantized neural network can be adjusted based on the comparison. Examples of suitable quantization parameters that can be adjusted at process block 1230 include bit widths used to represent mantissas or exponents, number of shared exponents in a block floating-point format, and parameters specifying which mantissa values in a tensor share a common exponent. The quantization parameters may be selected in order to trade off accuracy for computational resources used to implement the quantized neural network. For example, if the accuracy of the quantized neural network is determined to be sufficient (e.g., by comparing the accuracy to a predetermined threshold or as a ratio of the normal-precision neural network accuracy), then improved performance and/or reduced computational resource usage may be achieved by reducing bit widths used to represent values in one or more tensors of the quantized neural network or by inducing the number of shared exponent for a given tensor of the neural network. As another example, if the accuracy of the quantized neural network is determined to be not sufficient, then bit widths can be increased, or granularity of shared exponent or shared exponent schemes can be adjusted in order to attempt to improve accuracy of the quantized neural network. In some examples, the outlined method will perform the operations described above for both process blocks 1220 and 1230. In other examples, the outlined method may perform the operations described above for only one of process blocks 1220 or 1230. In some examples, the quantized precision neural network may be determined to be sufficient, and thus the operations described for process blocks 1220 and 1230, as well as process block 1240 below, may be omitted in certain passes.

An process block 1240, the normal-precision neural network, the quantized precision neural network, or both the normal-precision and quantized precision neural networks are retrained based on hyperparameters and/or quantization parameters adjusted at process blocks 1220 or 1230, respectively. After retraining the associated networks, the method proceeds to process block 1210, where comparison of output tensors generated by the corresponding retrained networks can be compared. Once the comparison at process block 1210 determines that differences between the normal-precision and the quantized precision neural networks are acceptable, the method proceeds to process block 1250.

At process block 1250, a hardware accelerator is programmed with values based on the values for the quantized-precision neural network determined by training or retraining the network. The accelerator can include a Tensor Processing Unit (TPU) and/or reconfigurable logic devices, such as those contained in FPGAs or a programmable circuit fabric. When the quantized format is a block floating-point format, the bit width can be readily adapted to map two structures of an FPGA. For example, depending on the size of input look up tables in an FPGA, certain bit widths may be more amenable to mapping to the underlying FPGA hardware. Configuration data for program in the accelerator can be generated by a general-purpose processor. For example, specialized instructions for a TPU or a configuration bit stream for an FPGA can be generated to implement the adjusted quantized neural network model. In some examples, configuring the hardware accelerator further includes providing an interface to translate between normal-precision floating-point, for example 16- or 32-bit fully point numbers and the block floating-point representations used on the hardware accelerated portion of the neural network.

XVI. Example Computing Environment

Figure 13:
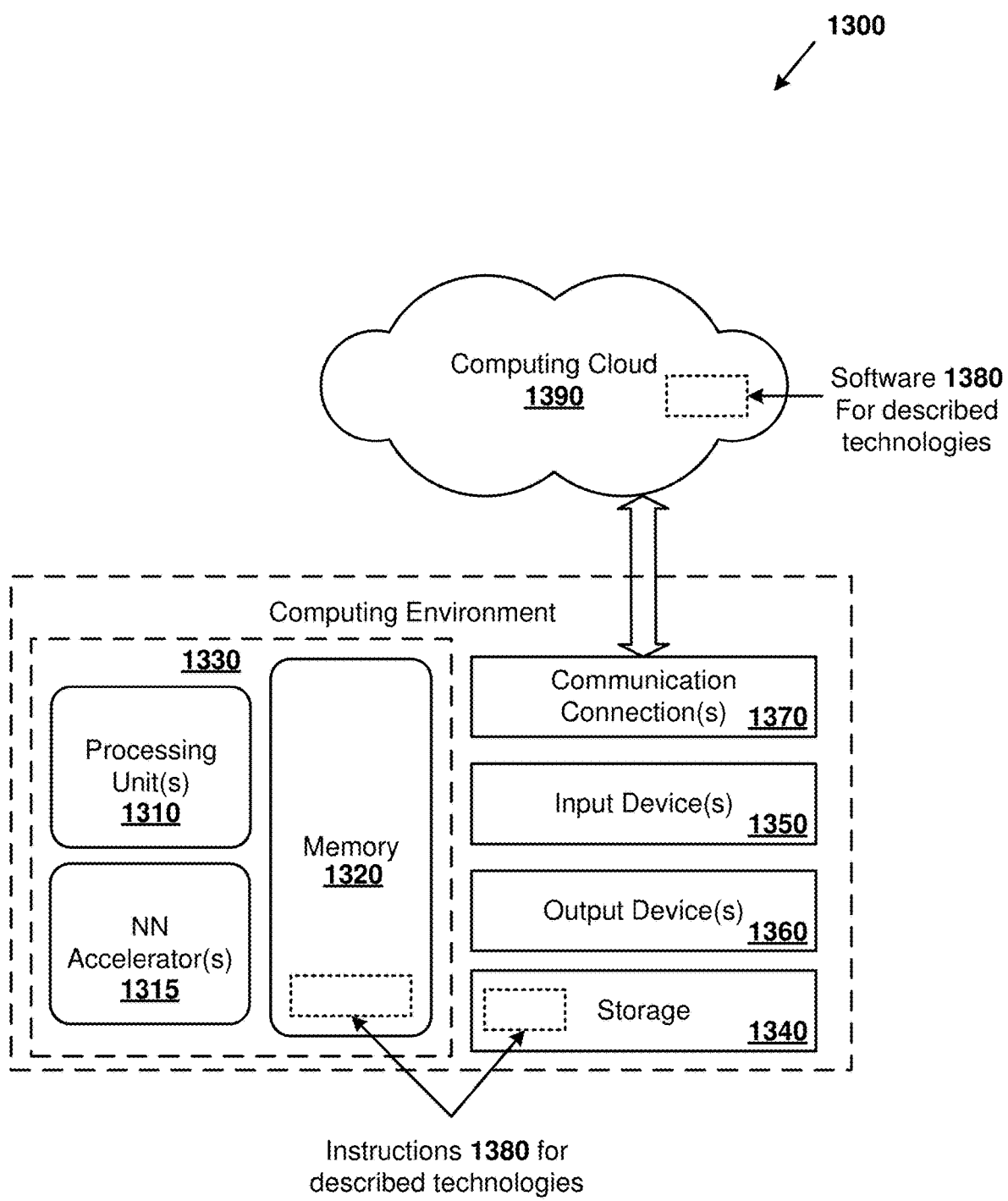
FIG. 13 is a diagram illustrating an example computing environment in which certain examples of the disclosed technology can be implemented.

FIG. 13 illustrates a generalized example of a suitable computing environment 1300 in which described embodiments, techniques, and technologies can be implemented. For example, the computing environment 1300 can implement disclosed techniques for configuring a processor to implement disclosed software architectures and neural networks, and/or compile code into computer-executable instructions and/or configuration bitstreams for performing such operations including neural networks, as described herein.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, the computing environment 1300 includes at least one processing unit 1310, an optional neural network accelerator 1315, and memory 1320. In FIG. 13, this most basic configuration 1330 is included within a dashed line. The processing unit 1310 executes computer-executable instructions and may be a real or a virtual processor. In a multi-processing system, multiple processing units execute computer-executable instructions to increase processing power and as such, multiple processors can be running simultaneously. The accelerator 1315 can include a Tensor Processing Unit (TPU) and/or reconfigurable logic devices, such as those contained in FPGAs or a programmable circuit fabric. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input device(s) 1350, one or more output device(s) 1360, and one or more communication connection(s) 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, disclosed compilers, processors, and/or neural networks are implemented with servers located in the computing environment, or the disclosed compilers, processors, and/or neural networks can be implemented on servers located in the computing cloud 1390. In some examples, the disclosed compilers execute on traditional central processing units (e.g., RISC or CISC processors), central processing units extended to include vector processing instructions, or vector processors.

Computer-readable media are any available media that can be accessed within a computing environment 1300. By way of example, and not limitation, with the computing environment 1300, computer-readable media include memory 1320 and/or storage 1340. As used herein, the term computer-readable storage media includes all tangible media for data storage such as memory 1320 and storage 1340, but not transmission media such as modulated data signals.

XVII. Experimental Results

FIGS. 14-18 are a series of charts illustrating experimental results observed when using quantized floating-point neural networks in comparison to corresponding models implemented using normal-precision floating-point.

Figure 14:
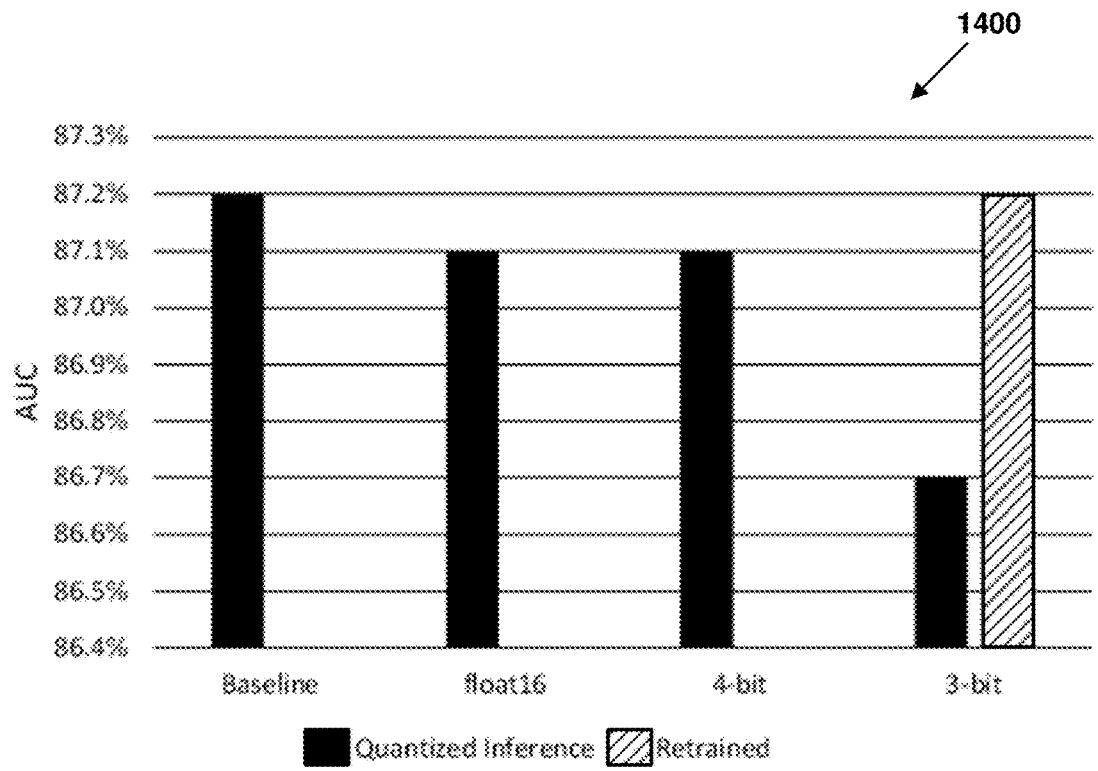
FIGS. 14-18 are charts illustrating experimental results that can be observed when performing certain examples of the disclosed technology.

FIG. 14 is a chart 1400 illustrating accuracy measured for a test neural network model implemented using various levels of quantization for Gated Recurrent Units (GRUs) within a neural network. As shown, and accuracy level of 87 point 2% is achieved with a baseline version of the test neural network model. Very little accuracy is lost when the baseline version is converted from 32-bit to a 16-bit floating-point format. Similarly, when the neural network is quantized to a four-bit block floating-point model, a similar level of accuracy as a 16-bit floating-point model is achieved. Results for a three-bit block floating-point model have the lowest accuracy depicted in the chart 1400. However, after applying a disclosed method of quantized retraining, the three-bit block floating-point model achieves a similar level of accuracy as the baseline model.

Figure 15:
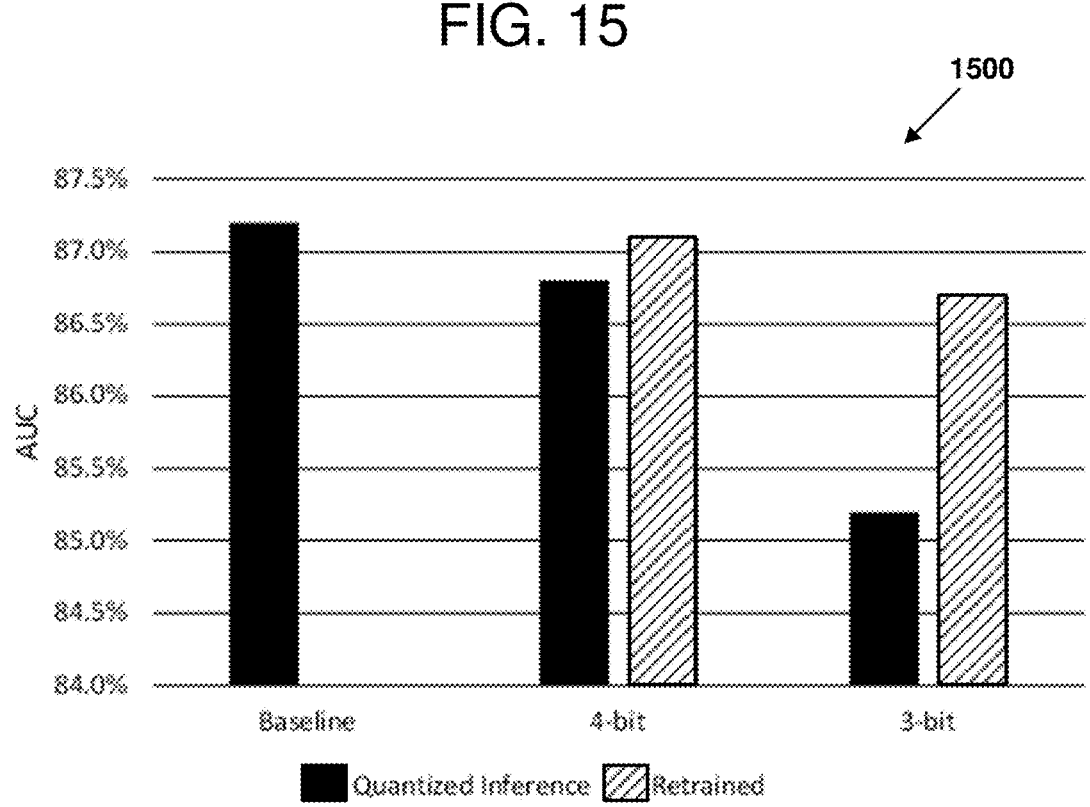

FIG. 15 is a chart 1500 illustrating accuracy measured for a test neural network model implemented using various levels of precision or quantization for both convolution kernels and GRUs within a neural network. As shown, some accuracy drop-off is seen going from the baseline model to a four-bit block floating-point model and to a three-bit block floating-point model. However, when quantized training as applied, the accuracy observed for both the four-bit models and the three-bit models approaches that of the baseline neural network model.

Figure 16:
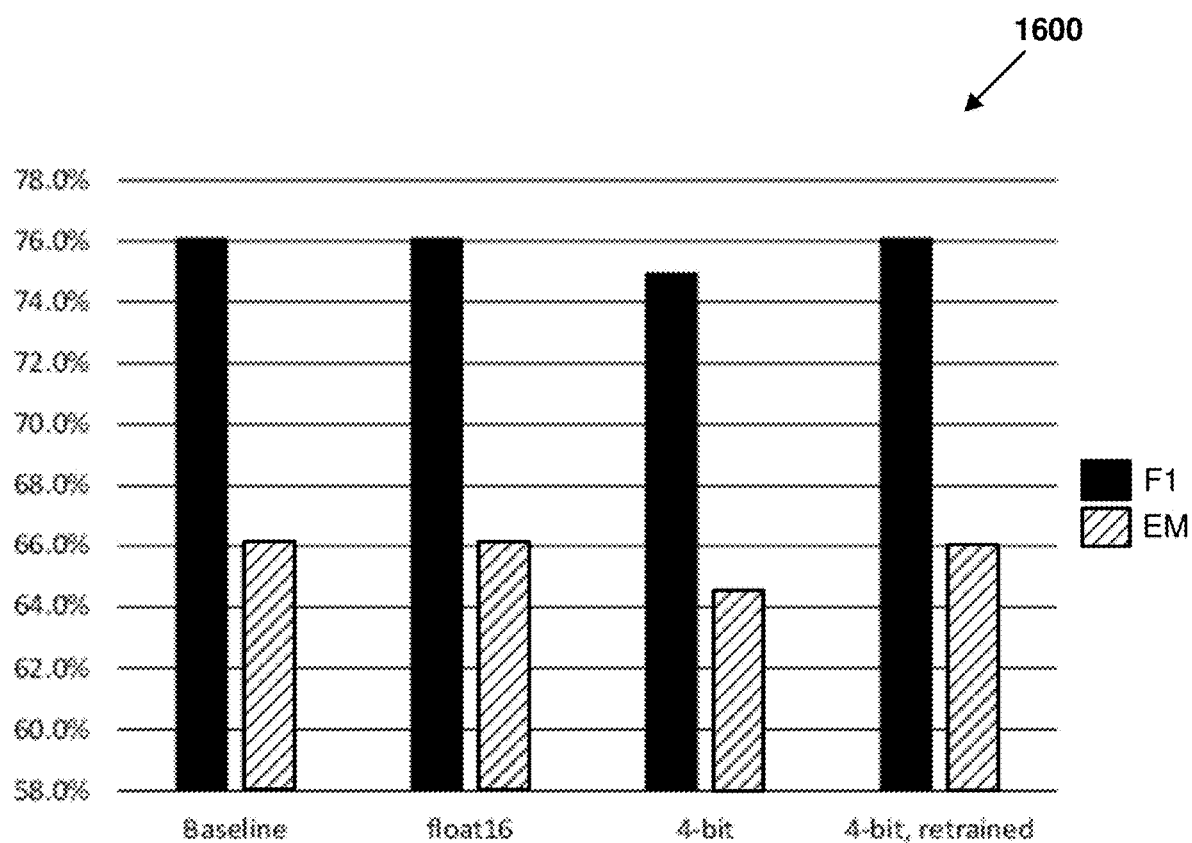

FIG. 16 is a chart 1600 depicting results for a neural network where long short-term memory nodes (LSTMs) are quantized. As shown, essentially no accuracy loss is observed after retraining a four-bit quantized block floating-point format. Approximately one percent accuracy loss is observed when using a three-bit quantized block floating-point format. The data series labeled "EM" represent the percentage of trials where the output of the neural network matches a ground truth answer for the neural network exactly. The data series labeled "F1" is a macro-average score for the output of the neural network.

Figure 17:
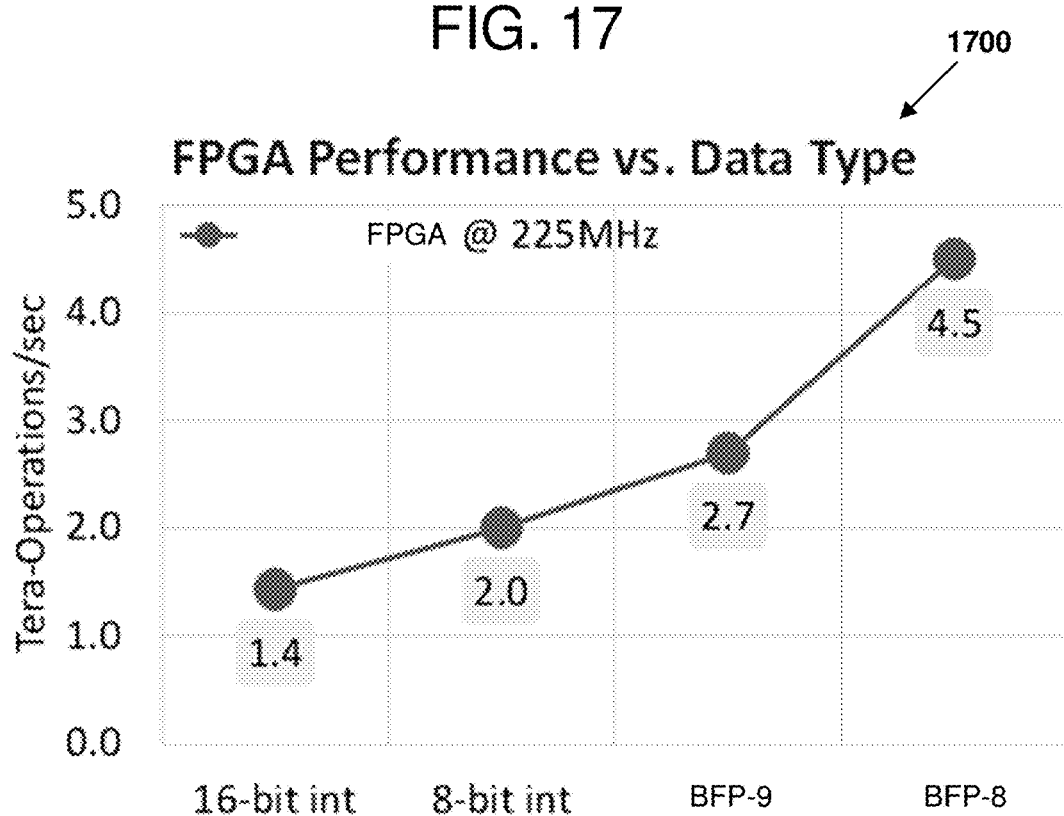
Figure 18:
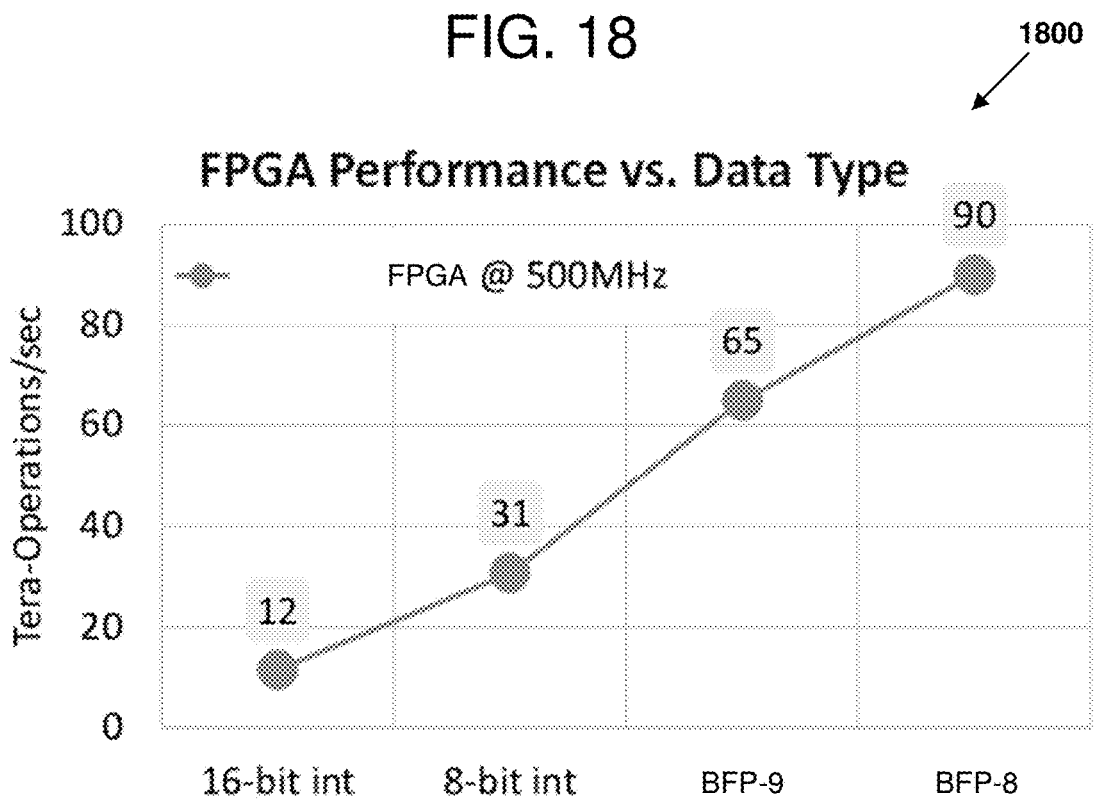

FIG. 17 is a chart 1700 depicting neural network performance as measured in Tera-operations per second achieved with a commercially available FPGA operating at 225 MHz. As shown, four floating-point formats are charted: a 16-bit fixed point format, and 8-bit fixed point format, a block floating-point format (BFP-9), which has one sign bit, five exponent bits, and three mantissa bits and a second block floating-point format (BFP-8), which has one sign bit, five exponent bits, and two mantissa bits. FIG. 18 is a chart 1800 depicting neural network performance achieved with another commercially available if PGA operating at 500 MHz. Therefore, by providing modeling and programming tools for optimizing quantized format neural network tensors on a general purpose computing platform, improved performance can be achieved after mapping the optimized quantized format neural network to a hardware accelerator. Such performance gains would not be as readily achieved without tools disclosed herein, based on, for example, reduced programmer productivity and effort required to understand tradeoffs in selecting various quantization parameters for a hardware accelerator. Hence, improved programmer productivity and ultimately improved hardware acceleration can be achieved using certain disclosed methods and apparatus.

XVIII. Additional Examples of the Disclosed Technology

Additional examples of the disclosed technology are disclosed in accordance with the examples above.

In some examples of the disclosed technology, a design flow methodology for quantized neural networks includes quantizing a normal-precision neural network model comprising tensors of normal-precision floating-point numbers, producing a quantized neural network model in a quantized-precision format, evaluating the quantized neural network model by applying input tensors to an input layer of the quantized neural network model, producing quantized output, and comparing the quantized output to output generated by applying the input tensors to the normal-precision floating-point model. In some examples, the quantized-precision format is a block floating-point format where at least two elements of the quantized neural network model share a common exponent. In some examples, based on the comparing, the quantized neural network model is retrained by adjusting at least one or more training parameters used to train the normal-precision neural network and training the quantized neural network with the adjusted at least one training parameter. In some examples, the adjusted training parameters comprises at least one of the following: a batch size, a momentum value, a number of training epochs, or a drop out rate. In some examples, methods further include producing the normal-precision neural network by training an untrained normal-precision neural network according to one or more training parameters at a selected learning rate. The adjusting the training parameters includes adjusting a learning rate to be lower than the selected learning rate used to train the untrained normal-precision neural network. In some examples, based on the comparing, a new quantized-precision format is selected having at least one quantization parameter different than the quantized-precision format and the normal-precision neural network model is quantized to produce a re-quantized neural network model in the new quantized-precision format. In some examples, the output of the quantized-precision format model is compared to the output of the normal-precision neural network model and a determination is made whether the accuracy of the results is sufficient. In some examples, if the accuracy is determined not sufficient, then the quantized-format network is retrained, but without adjusting training parameters or other hyperparameters of the neural network.

In some examples, quantization parameter that can be adjusted, for at least one layer of the quantized neural network, at least one or more of the following: a bit width used to represent bit widths of node weight mantissas, a bit width used to represent bit widths of node weight exponents, a bit width used to represent bit widths of activation value mantissas, a bit width used to represent bit widths of activation value exponents, a tile size for a shared exponent, a parameter to share an exponent on a per-row basis, a parameter to share an exponent on a per-column basis, or a parameter specifying a method of common exponent selection.

In some examples, methods include, based on the comparing, sparsifying at least one weight of the quantized neural network. For example, node connections can be deleted, or weights reduced or set to zero, to sparsify the quantized neural network. Some methods further include, based on the comparing, changing a hyperparameter used to train the normal-precision neural network or the quantized-precision network and then retraining the quantized-precision neural network with the changed hyperparameter. In some examples, the changed hyperparameter includes one of a number of hidden layers in the normal-precision neural network, a node type for a layer of the normal-precision neural network, or a learning rate for training the neural network. In some examples, the normal-precision neural network model is quantized according to a set of one or more quantization parameters. Methods can further include, based on the comparing, adjusting at least one of the quantization parameters and retraining the quantized neural network model using the adjusted at least one of the quantization parameters.

In some examples of the disclosed technology, methods are carried out with a quantization-enabled system for modeling neural networks comprising tensors representing node weights and edges. In some examples, the quantization-enabled system includes memory, at least one processor coupled to the memory, and one or more computer readable storage media storing computer-readable instructions that when executed by the at least one processor, cause the system to perform any of the disclosed methods of evaluating the neural network. In some examples, the instructions include instructions that cause the system to transform a normal-precision neural network model to a block floating-point format neural network model according to a set of quantization parameters, the block floating-point format model including at least one shared exponent, instructions that cause the system to apply input tensors to an input layer of the block floating-point format neural network model, producing first output values, and instructions that cause the system to calculate differences between the first output values and second output values generated by applying the input tensors to the normal-precision neural network model.

In some examples, the instructions can cause the system to retrain the normal-precision neural network model by adjusting a hyperparameter and retraining the normal-precision neural network model with the adjusted hyperparameter. In some examples, the instructions can cause the system to retrain the block floating-point format neural network model by adjusting a hyperparameter and retraining the block floating-point format neural network model with the adjusted hyperparameter. In some example, the instructions can cause the system to, responsive to the calculated differences, cause the system to select a new block floating-point format having at least one parameter different than the set of quantization parameters. In some examples, the instructions cause the system to quantize the normal-precision neural network model to produce a re-quantized neural network model in the new block floating-point format.

In some examples, the at least one different parameter comprises, for at least one layer of block floating-point format neural network model, one or more of the following:

a bit width used to represent bit widths of node weight mantissas, a bit width used to represent bit widths of node weight exponents, a bit width used to represent bit widths of activation value mantissas, a bit width used to represent bit widths of activation value exponents, a tile size for a shared exponent, a parameter to share an exponent on a per-row basis, a parameter to share an exponent on a per-column basis, or a parameter specifying a method of common exponent selection.

In some examples, the system further includes a hardware accelerator configured to evaluate the block floating-point format neural network model by receiving input tensors, processing operations for nodes of the block floating-point neural network model representing in the block floating-point format, and produce an output tensor. In some examples, the processors are configured to configure the hardware accelerator with the block floating-point format model.

In some examples of the disclosed technology, one or more computer-readable storage media storing computer-readable instructions that when executed by a processor, cause the processor to provide an interface for designing a block floating-point format neural network model, the instructions including: instructions that cause the system to provide tensors for a normal-precision neural network model, instructions that cause the system to convert the normal-precision format tensors to a block floating-point format for a block floating-point neural network model, instructions that cause the system to apply at least one input tensor to an input layer of the normal-precision neural network model, producing at least one normal-precision output tensor, instructions that cause the system to apply the at least one input tensor to an input layer of the block floating-point neural network model, producing at least one output tensor, and instructions that cause the system to compare the at least one normal-precision output tensor and the at least one output tensor.

In some examples, the instructions can cause the system to automatically select a hyperparameter to retrain the normal-precision neural network model or the block floating-point neural network model. In some examples, the instructions can cause the system to retrain the normal-precision neural network model or the block floating-point neural network model based on the selected hyperparameter. In some examples, the block floating-point format is a first block floating-point format, and the instructions further include instructions to, based on the compare, select a new block floating-point format having at least one parameter different than the old block floating-point format, and instructions to convert the normal-precision format tensors to new block floating-point format to produce a new block floating-point neural network model.

One or more computer-readable storage media store computer-readable instructions that when executed by a computer, cause the computer to perform any one of the disclosed methods.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. A method comprising:
prior to applying a quantization operation, reshaping or splitting at least one tensor that is included among multiple tensors of a normal-precision neural network model, said reshaping or splitting facilitates handling of shared exponents over granulates that are finer than an entire tensor;
performing the quantization operation by quantizing the normal-precision neural network model, which comprises the multiple tensors of normal-precision floating-point numbers, producing a quantized neural network model in a quantized-precision format;
evaluating the quantized neural network model by applying input tensors to an input layer of the quantized neural network model, producing quantized output;
comparing the quantized output to output generated by applying the input tensors to the normal-precision floating-point model; and
based on the comparing, selecting a new quantized-precision format having at least one quantization parameter different than the quantized-precision format, wherein the at least one different quantization parameter comprises, for at least one layer of the quantized neural network, at least a parameter to share an exponent on a per-row basis and/or a parameter to share an exponent on a per-column basis.

2. The method of claim 1, wherein:
the quantized-precision format is a block floating-point format where at least two elements of the quantized neural network model share a common exponent.

3. The method of claim 1, further comprising:
based on the comparing, retraining the quantized neural network model by adjusting at least one or more training parameters used to train the normal-precision neural network and training the quantized neural network with the adjusted at least one training parameter.

4. The method of claim 3, wherein the adjusted at least one of the training parameters comprises at least one of the following: a batch size, a momentum value, a number of training epochs, or a drop out rate.

5. The method of claim 3, further comprising:
producing the normal-precision neural network by training an untrained normal-precision neural network according to one or more training parameters at a selected learning rate; and
wherein the adjusting the at least one of the training parameters comprises adjusting a learning rate to be lower than the selected learning rate used to train the untrained normal-precision neural network.

6. The method of claim 1, further comprising:
quantizing the normal-precision neural network model to produce a re-quantized neural network model in the new quantized-precision format.

7. The method of claim 6, wherein the at least one different quantization parameter comprises, for at least one layer of the quantized neural network, at least one of: a bit width used to represent bit widths of node weight mantissas, a bit width used to represent bit widths of node weight exponents, a bit width used to represent bit widths of activation value mantissas, a bit width used to represent bit widths of activation value exponents, a tile size for a shared exponent, or a parameter specifying a method of common exponent selection.

8. The method of claim 1, further comprising, based on the comparing, sparsifying at least one weight of the quantized neural network.

9. The method of claim 1, further comprising:
based on the comparing, changing a hyperparameter used to train the normal-precision neural network or the quantized-precision network and retraining the quantized-precision neural network with the changed hyperparameter; and
wherein the changed hyperparameter includes one of a number of hidden layers in the normal-precision neural network, a node type for a layer of the normal-precision neural network, or a learning rate for training the neural network.

10. The method of claim 1, wherein the normal-precision neural network model is quantized according to a set of one or more quantization parameters, the method further comprising:
based on the comparing, adjusting at least one of the quantization parameters; and
retraining the quantized neural network model using the adjusted at least one of the quantization parameters.

11. A quantization-enabled system for modeling a neural network comprising tensors representing node weights and edges, the system comprising:
one or more processors; and
one or more computer readable storage media that store computer-readable instructions that are executable by the one or more processors to cause the system to:
prior to applying a quantization operation, reshape or split at least one tensor that is included among multiple tensors of a normal-precision neural network model, said reshaping or splitting facilitates handling of shared exponents over granulates that are finer than an entire tensor;
transform the normal-precision neural network model to a block floating-point format neural network model according to a set of quantization parameters, the block floating-point format model including at least one shared exponent;
apply input tensors to an input layer of the block floating-point format neural network model, producing first output values;
calculate differences between the first output values and second output values generated by applying the input tensors to the normal-precision neural network model; and
responsive to the calculated differences, select a new block floating-point format having at least one parameter different than the set of quantization parameters, wherein the at least one different parameter comprises, for at least one layer of the block floating-point format neural network model, a parameter to share an exponent on a per-row basis and/or a parameter to share an exponent on a per-column basis.

12. The system of claim 11, wherein execution of the computer-readable instructions further causes the system to:
retrain the normal-precision neural network model by adjusting a hyperparameter and retraining the normal-precision neural network model with the adjusted hyperparameter.

13. The system of claim 11, wherein execution of the computer-readable instructions further causes the system to: retrain the block floating-point format neural network model by adjusting a hyperparameter and retraining the block floating-point format neural network model with the adjusted hyperparameter.

14. The system of claim 11, wherein execution of the computer-readable instructions further causes the system to:
perform the quantization operation by quantizing the normal-precision neural network model to produce a re-quantized neural network model in the new block floating-point format.

15. The system of claim 14, wherein the at least one different parameter comprises, for at least one layer of block floating-point format neural network model:
a bit width used to represent bit widths of node weight mantissas, a bit width used to represent bit widths of node weight exponents, a bit width used to represent bit widths of activation value mantissas, a bit width used to represent bit widths of activation value exponents, a tile size for a shared exponent, or a parameter specifying a method of common exponent selection.

16. The system of claim 11, further comprising:
a hardware accelerator configured to evaluate the block floating-point format neural network model by receiving input tensors, processing operations for nodes of the block floating-point neural network model representing in the block floating-point format, and produce an output tensor; and
wherein the processors are configured to configure the hardware accelerator with the block floating-point format model.

17. A computer system comprising:
at least one processor; and
at least one hardware storage device that stores instructions that are executable by the at least one processor to cause the computer system to:
prior to applying a quantization operation, reshape or split at least one tensor that is included among multiple tensors of a normal-precision neural network model, said reshaping or splitting facilitates handling of shared exponents over granulates that are finer than an entire tensor;
perform the quantization operation by quantizing the normal-precision neural network model, which comprises the multiple tensors of normal-precision floating-point numbers, producing a quantized neural network model in a quantized-precision format;
evaluate the quantized neural network model by applying input tensors to an input layer of the quantized neural network model, producing quantized output;
compare the quantized output to output generated by applying the input tensors to the normal-precision floating-point model; and
based on the comparing, select a new quantized-precision format having at least one quantization parameter different than the quantized-precision format, wherein the at least one different quantization parameter comprises, for at least one layer of the quantized neural network, at least a parameter to share an exponent on a per-row basis and/or a parameter to share an exponent on a per-column basis.

* * * * *